United States Patent
Hirota et al.

(10) Patent No.: US 7,471,886 B2
(45) Date of Patent: Dec. 30, 2008

(54) CAMERA WITH SHAKE CORRECTION MECHANISM

(75) Inventors: Toshihiko Hirota, Sakai (JP); Yoshiharu Tanaka, Kawachinagano (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 488 days.

(21) Appl. No.: 11/210,503

(22) Filed: Aug. 24, 2005

(65) Prior Publication Data

US 2006/0056829 A1  Mar. 16, 2006

(30) Foreign Application Priority Data

Sep. 10, 2004  (JP) ............................. 2004-264343

(51) Int. Cl.
*G03B 17/00*  (2006.01)
(52) U.S. Cl. ............................. 396/52; 396/55; 382/255
(58) Field of Classification Search .................. 396/52, 396/55; 382/255
See application file for complete search history.

(56) References Cited

U.S. PATENT DOCUMENTS

| | | | | |
|---|---|---|---|---|
| 4,777,502 A | * | 10/1988 | Lawther | 396/358 |
| 5,030,984 A | * | 7/1991 | Buckler et al. | 396/153 |
| 5,842,053 A | * | 11/1998 | Ueyama et al. | 396/55 |
| 2003/0067544 A1 | * | 4/2003 | Wada | 348/208.7 |

FOREIGN PATENT DOCUMENTS

JP    05-061091    3/1993

(Continued)

OTHER PUBLICATIONS

Sarita, Jasuaki, Hara, Yoshihiro, and Wada, Shigeru, "Development of DSC Shake Compensation technology through Image Sensor Swing", Konica Minolta Technology Report, vol. 1, 2004, 5 pages, including one (1) page of an English Translation. 3.1 System Hardware.

(Continued)

*Primary Examiner*—Melissa J Koval
*Assistant Examiner*—Michael A Strieb
(74) *Attorney, Agent, or Firm*—Brinks Hofer Gilson & Lione

(57) ABSTRACT

A camera casing 100 accommodates therein a shake correction unit 2 for oscillatingly supporting an image sensor 20, a control circuit board 6 loaded with electronic components such as ASIC 61 and a driving control circuit 62, and a viewfinder section 7 for allowing a user to confirm a field to be photographed. The shake correction unit 2, the control circuit board 6, and the viewfinder section 7 are arranged in proximity to each other on planes substantially identical to each other. The shake correction unit 2 has a first driving unit 3a arranged on the side of a side portion 20b of the image sensor 20 to apply an oscillating force to the image sensor 20 to oscillate the image sensor 20 in a first direction (pitch direction shown by the arrows p in FIG. 3) perpendicular to optical axis, and a second driving unit 3b arranged on the side of a side portion 20d of the image sensor 20 to apply an oscillating force to the image sensor 20 to oscillate the image sensor 20 in a second direction (yaw direction shown by the arrows y in FIG. 3) perpendicular to the optical axis and the first direction.

16 Claims, 23 Drawing Sheets

FOREIGN PATENT DOCUMENTS

| | | |
|---|---|---|
| JP | 06-046322 | 2/1994 |
| JP | 6-332026 | 12/1994 |
| JP | 09-269520 | 10/1997 |
| JP | 2000-059655 | 2/2000 |
| JP | 2000-227614 | 8/2000 |
| JP | 2002-135631 | 5/2002 |
| JP | 2003-005267 | 1/2003 |
| JP | 2003-043541 | 2/2003 |
| JP | 2003-110928 | 4/2003 |
| JP | 2003-110929 | 4/2003 |
| JP | 2003-222922 | 8/2003 |
| JP | 2004-054180 | 2/2004 |

OTHER PUBLICATIONS

Notice for Japanese Patent Application No. 2004-264343, dated Mar. 6, 2007, nine (9) pages, including five (5) pages of an English translation.

"Notice of Reasons for Rejection," Japanese Patent Office Action for Japanese Patent Application No. JP 2004-264343, issued Sep. 7, 2006, 6 pages.

* cited by examiner

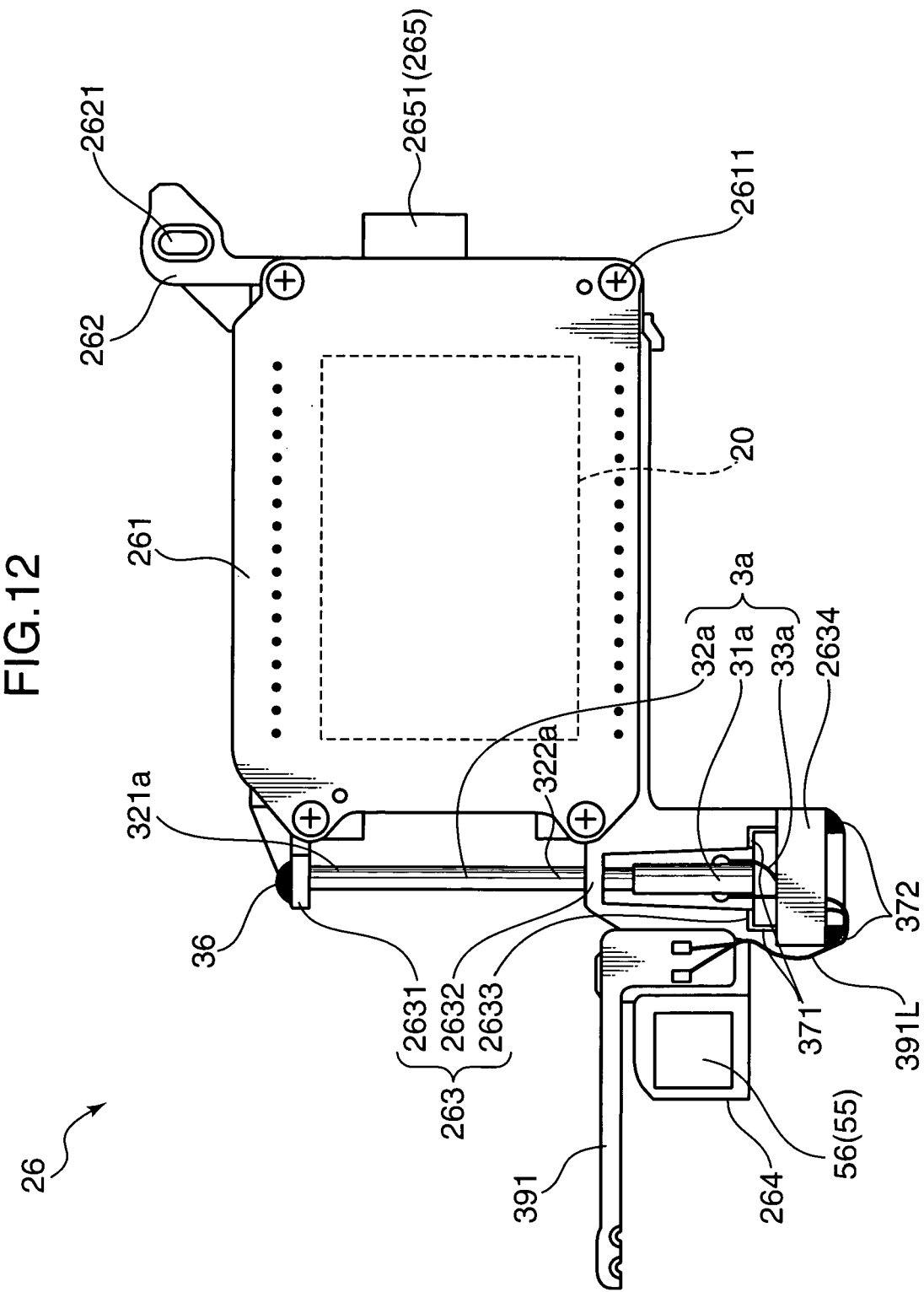

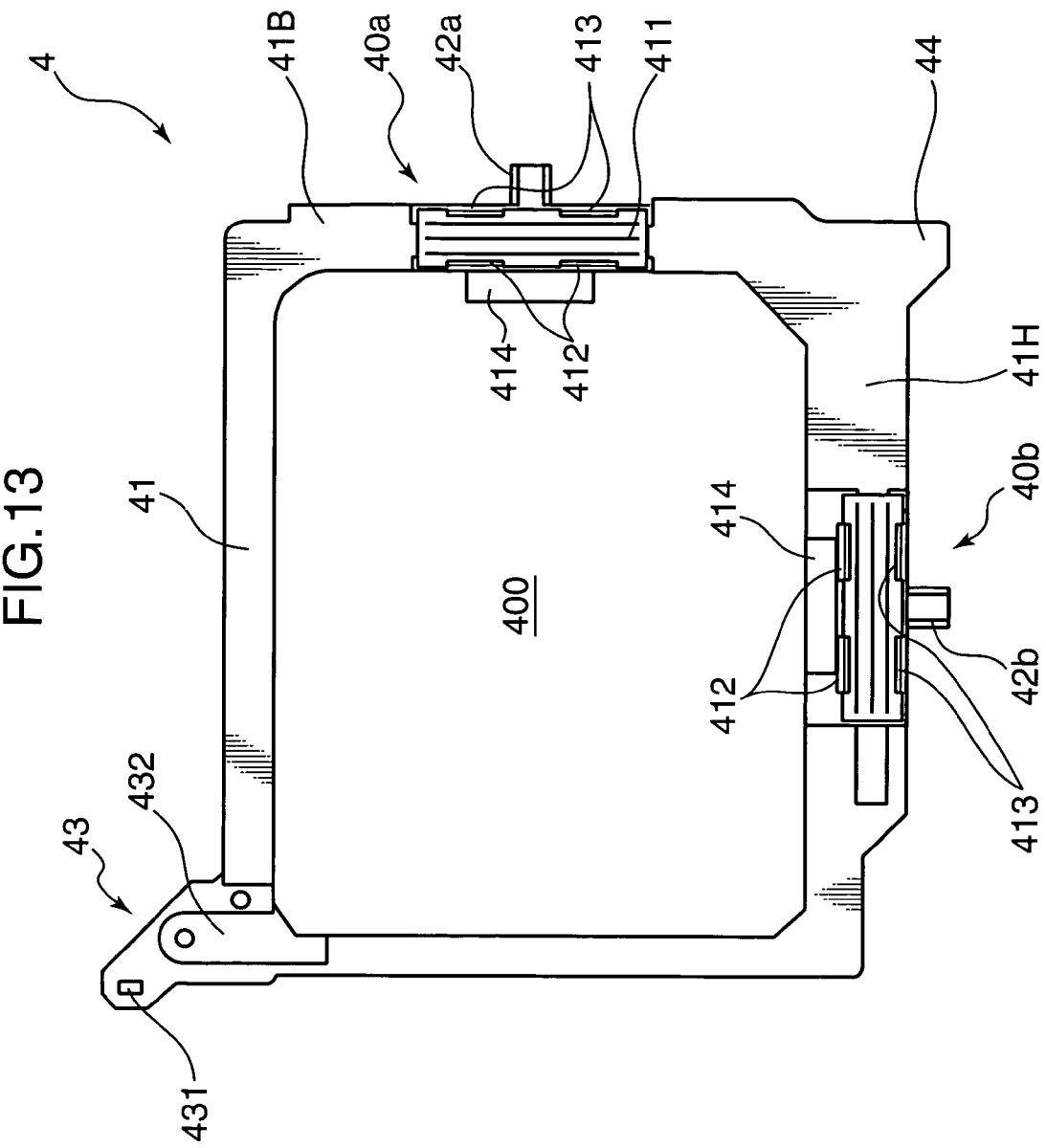

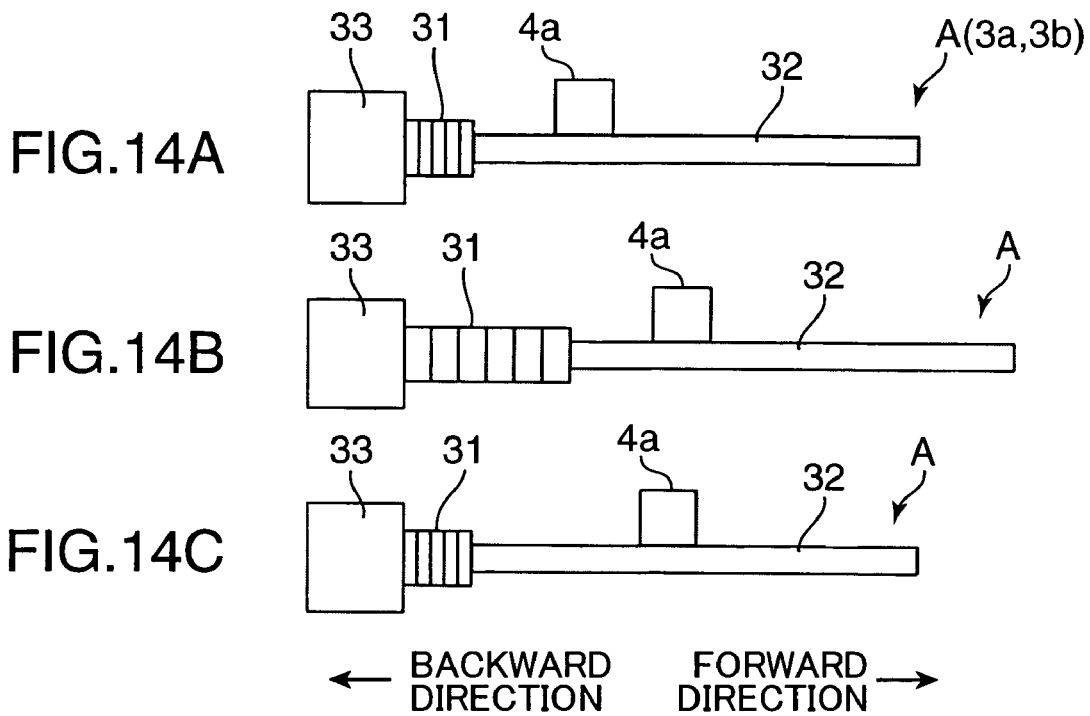
FIG.14A
FIG.14B
FIG.14C
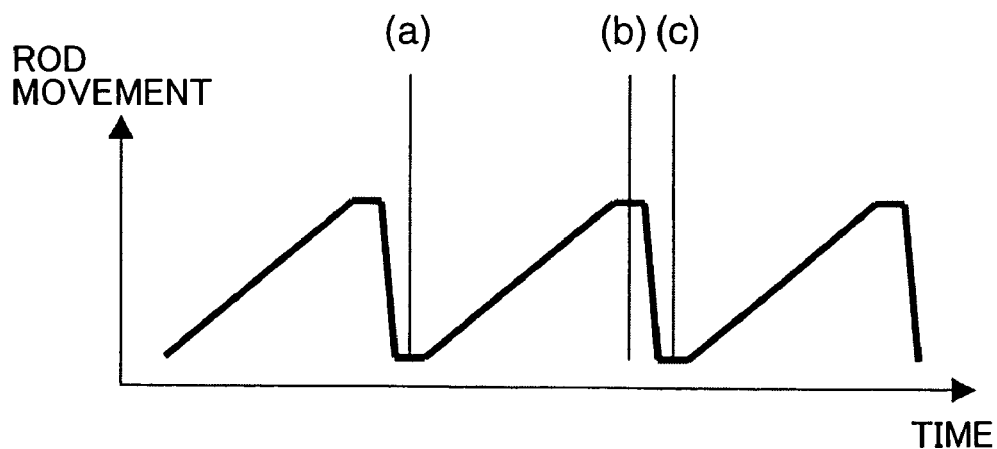
FIG.15

CAMERA WITH SHAKE CORRECTION MECHANISM

This application is based on Japanese Patent Application No. 2004-264343 filed on Sep. 10, 2004, the contents of which are hereby incorporated by reference.

BACKGROUND OF THE INVENTION

1. Field of the Invention

The present invention relates to a camera equipped with a shake correction mechanism such as a digital still camera and a digital video camera loaded with a shake correction mechanism for correcting shake of the camera.

2. Description of the Related Art

A shake correction mechanism of swinging an image taking device is known, as disclosed in Japanese Unexamined Patent Publication No. 2003-110929. The shake correction mechanism disclosed in the publication is of an active type in which part or entirety of an optical system is swung so as to correct misalignment of optical axis on the basis of a shake of the camera. In the shake correction mechanism, a lens dedicatedly used for shake correction is not required, and shake correction can be realized in a compact camera capable of high-quality image photographing. In the shake correction mechanism, an oscillating force of oscillating the image taking device in a direction perpendicular to the optical axis is applied to the image taking device by a piezoelectric actuator or a like device provided on the side of the image taking device.

In the publication, the shake correction mechanism is built in the casing of the camera body in such a manner that a shake correction unit provided with a driving section for applying an oscillating force to the image taking device to oscillate the image taking device in the direction perpendicular to the optical axis, and a control circuit board loaded with an application specific integrated circuit (ASIC), i.e., a semiconductor integrated circuit device for image processing, as well as a driving control circuit for controlling the driving section are aligned to each other in the optical axis direction. The control circuit board and the shake correction unit (image taking device) are electrically connected with each other by a flexible wiring circuit board.

The camera with the shake correction mechanism disclosed in the publication has a large thickness in the optical axis direction of the camera because the shake correction unit and the control circuit board are aligned to each other in the casing in the optical axis direction of the camera, which is a hindrance against miniaturization of the camera. In view of the above, there is proposed an idea of arranging the shake correction unit and the control circuit board substantially on the same plane perpendicular to the optical axis. Such an arrangement, however, entails exact positional alignment of these two members in view of the fact that a driving section such as a piezoelectric actuator is arranged on the side of the image taking device. It is highly likely that noises may be picked up easily owing to the structure, or the size of the camera in a direction perpendicular to the optical axis direction may be increased.

SUMMARY OF THE INVENTION

In view of the problems residing in the prior art, it is an object of the present invention to provide a camera with a shake correction mechanism that enables to attain noise reduction and miniaturization by optimizing the positional arrangement of a shake correction unit and a control circuit board in a casing of a camera body, which is adapted to digital still cameras and digital video cameras equipped with the shake correction unit and the control circuit board as individual structural members.

One aspect of the present invention is directed to a camera with a shake correction mechanism. The camera comprises: an image sensor to capture a light image of an object to be photographed; a shake detector to detect a shake of a main body of the camera; a shake correction unit including a driving section to apply an oscillating force to the image sensor at a side portion thereof to oscillate the image sensor in a direction perpendicular to an optical axis of the camera; and a control circuit board loaded with electronic components thereon.

The shake correction unit and the control circuit board are arranged in proximity to each other on planes substantially identical to each other, and the driving section is arranged on a side of a side portion of the image sensor opposite to a side portion of the image sensor in proximity to an adjoining portion of the shake correction unit and the control circuit board.

These and other objects, features and advantages of the present invention will become more apparent upon reading of the following detailed description along with the accompanying drawings.

BRIEF DESCRIPTION OF THE DRAWINGS

FIGS. 4A and 4B are illustrations each showing an external appearance of a digital camera with a shake correction mechanism embodying the present invention, wherein FIG. 4A is a front view, and FIG. 4B is a rear view.

FIG. 12 is a plan view showing an image sensor holder of the shake correction unit.

FIG. 13 is a plan view showing a slider of the shake correction unit.

FIGS. 14A through 14C are illustrations for explaining how an actuator is driven.

FIG. 15 is a graph showing movement of a rod of the actuator with time.

FIGS. 16A and 16B are perspective views showing how the actuator is fixed by an adhesive, wherein FIG. 16A shows a state that a weight member of the actuator is fixed by the adhesive at two positions, and FIG. 16B shows a state that the weight member is fixed by the adhesive at four positions.

FIG. 17B is a graph showing output voltage characteristics of the position detecting section.

DETAILED DESCRIPTION OF THE PREFERRED EMBODIMENTS (Brief Description on Embodiments) First, preferred embodiments of the present invention are described briefly.

(1) A camera with a shake correction mechanism according to an embodiment of the present invention is a camera comprising: an image sensor to capture a light image of an object to be photographed; a shake detector to detect a shake of a main body of the camera; a shake correction unit including a driving section to apply an oscillating force to the image sensor at a side portion thereof to oscillate the image sensor in a direction perpendicular to an optical axis of the camera; and a control circuit board loaded with electronic components thereon, wherein the shake correction unit and the control circuit board are arranged in proximity to each other on planes substantially identical to each other, and the driving section is arranged on a side of a side portion of the image sensor opposite to a side portion of the image sensor in proximity to an adjoining portion of the shake correction unit and the control circuit board.

(2) A camera with a shake correction mechanism according to another embodiment of the present invention is a camera comprising: an image sensor in a rectangular shape defining four side portions to capture a light image of an object to be photographed; a shake detector to detect a shake of a main body of the camera; a shake correction unit including a driving section to apply an oscillating force to the image sensor at one of the four side portions to oscillate the image sensor in a direction perpendicular to an optical axis of the camera; and a control circuit board loaded with electronic components thereon, wherein the shake correction unit and the control circuit board are arranged in proximity to each other on planes substantially identical to each other, and the driving section is arranged on a side of one of the four side portions opposite to another one of the four side portions in proximity to an adjoining portion of the shake correction unit and the control circuit board.

Figure 1:
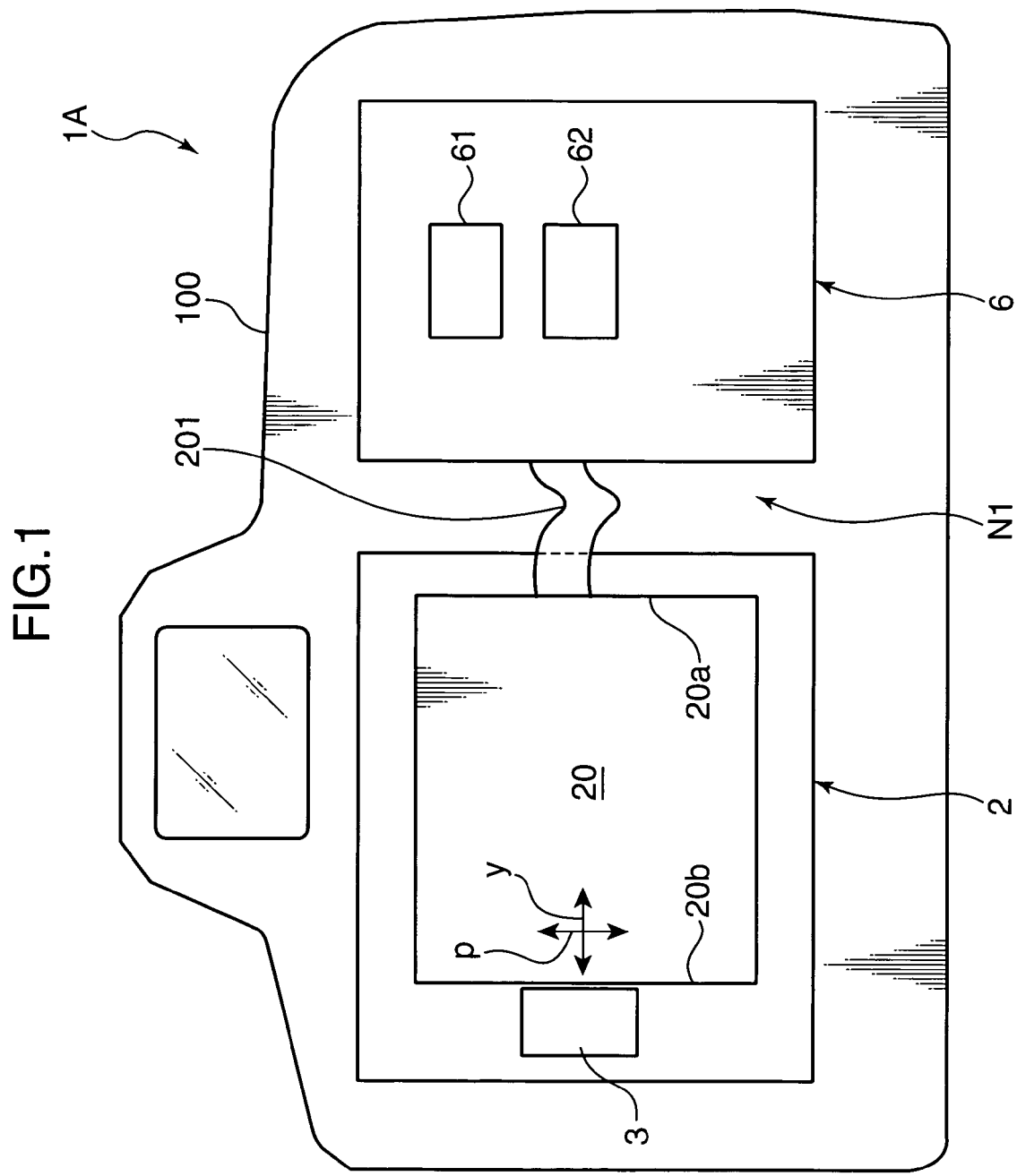
FIG. 1 is an illustration schematically showing arrangements (1) and (2) in the present invention.

FIG. 1 is an illustration schematically showing the arrangements (1) and (2). Referring to FIG. 1, a camera 1A accommodates, in a casing 100 of a camera body thereof, a shake correction unit 2 for oscillatingly supporting an image sensor 20, and a control circuit board 6 loaded with electronic components such as an ASIC 61 and a driving control circuit 62. The shake correction unit 2 and the control circuit board 6 are provided in proximity to each other on the planes substantially identical to each other. Throughout the specification and claims, the expression "in proximity to each other on the planes substantially identical to each other" means that the relevant members are arranged proximate and in juxtaposition to each other in a transverse direction, namely, in a direction perpendicular to the optical axis of the camera without alignment in the optical axis direction. As far as the shake correction unit 2 and the control circuit board 6 are not aligned to each other in the optical axis direction, these members may be arranged in the casing 100 at different positions from each other in the depthwise direction or the height direction of the camera. The shake correction unit 2 and the control circuit board 6 are electrically connected with each other by a flexible wiring substrate 201. The shake correction unit 2 is provided with a driving section 3 on the side of a side portion of the image sensor 20 to apply an oscillating force to the image sensor 20 to oscillate the image sensor 20 in the first direction (pitch direction shown by the arrows p in FIG. 1) perpendicular to the optical axis, and in the second direction (yaw direction shown by the arrows y in FIG. 1) perpendicular to the optical axis and the first direction. Examples of the driving section 3 are various actuators capable of generating an oscillating force at least in two axial directions.

In the camera 1A having the arrangement (1) or (2), the driving section 3 is arranged on the side of a side portion 20b of the image sensor 20, namely, on the side opposite to a side portion 20a of the image sensor 20 in proximity to an adjoining portion N1 between the shake correction unit 2 and the control circuit board 6. This arrangement eliminates providing a space for installing the driving section 3 on the adjoining portion N1, whereby the shake correction unit 2 and the control circuit board 6 can be arranged closer to each other. Thereby, the wiring by the flexible wiring substrate 201 can be shortened by the length corresponding to the space. Transmission of analog signals, which are liable to be affected by noises, is indispensable between the image sensor 20 and the ASIC 61, and between the driving section 3 and the driving control circuit 62. As mentioned above, since the wiring by the flexible wiring substrate 201 can be shortened, the camera is less likely to be affected by noises. Further, since the shake correction unit 2 and the control circuit board 6 are arranged in proximity to each other on the planes substantially identical to each other, the size of the camera in the optical axis direction can be reduced.

Thus, according to the arrangements (1) and (2), the camera can be miniaturized in the thickness and transverse directions thereof despite providing the shake correction unit in the camera. Further, since the wiring by the flexible wiring substrate can be shortened, and the camera is less likely to be affected by noises, high-quality image recording is realized.

(3) A camera with a shake correction mechanism according to yet another embodiment of the present invention is a camera comprising: an image sensor to capture a light image of an object to be photographed; a shake detector to detect a shake of a main body of the camera; a shake correction unit including a driving section to apply an oscillating force to the image sensor at a side portion thereof to oscillate the image sensor in a direction perpendicular to an optical axis of the camera; and a viewfinder section to allow a user to confirm a field to be photographed, wherein the shake correction unit and the viewfinder section are arranged in proximity to each other on planes substantially identical to each other, and the driving section is arranged on the side of a side portion of the image sensor opposite to a side portion of the image sensor in proximity to an adjoining portion of the shake correction unit and the viewfinder section.

(4) A camera with a shake correction mechanism according to a further embodiment of the present invention is a camera comprising: an image sensor in the form of a rectangular shape defining four side portions to capture a light image of an object to be photographed; a shake detector to detect a shake of a main body of the camera; a shake correction unit including a driving section to apply an oscillating force to the image sensor at one of the four side portions to oscillate the image sensor in a direction perpendicular to an optical axis of the camera; and a viewfinder section to allow a user to confirm a field to be photographed, wherein the shake correction unit and the viewfinder section are arranged in proximity to each other on planes substantially identical to each other, and the driving section is arranged on a side of one of the four side portions opposite to another one of the four side portions in proximity to an adjoining portion of the shake correction unit and the viewfinder section.

Figure 2:
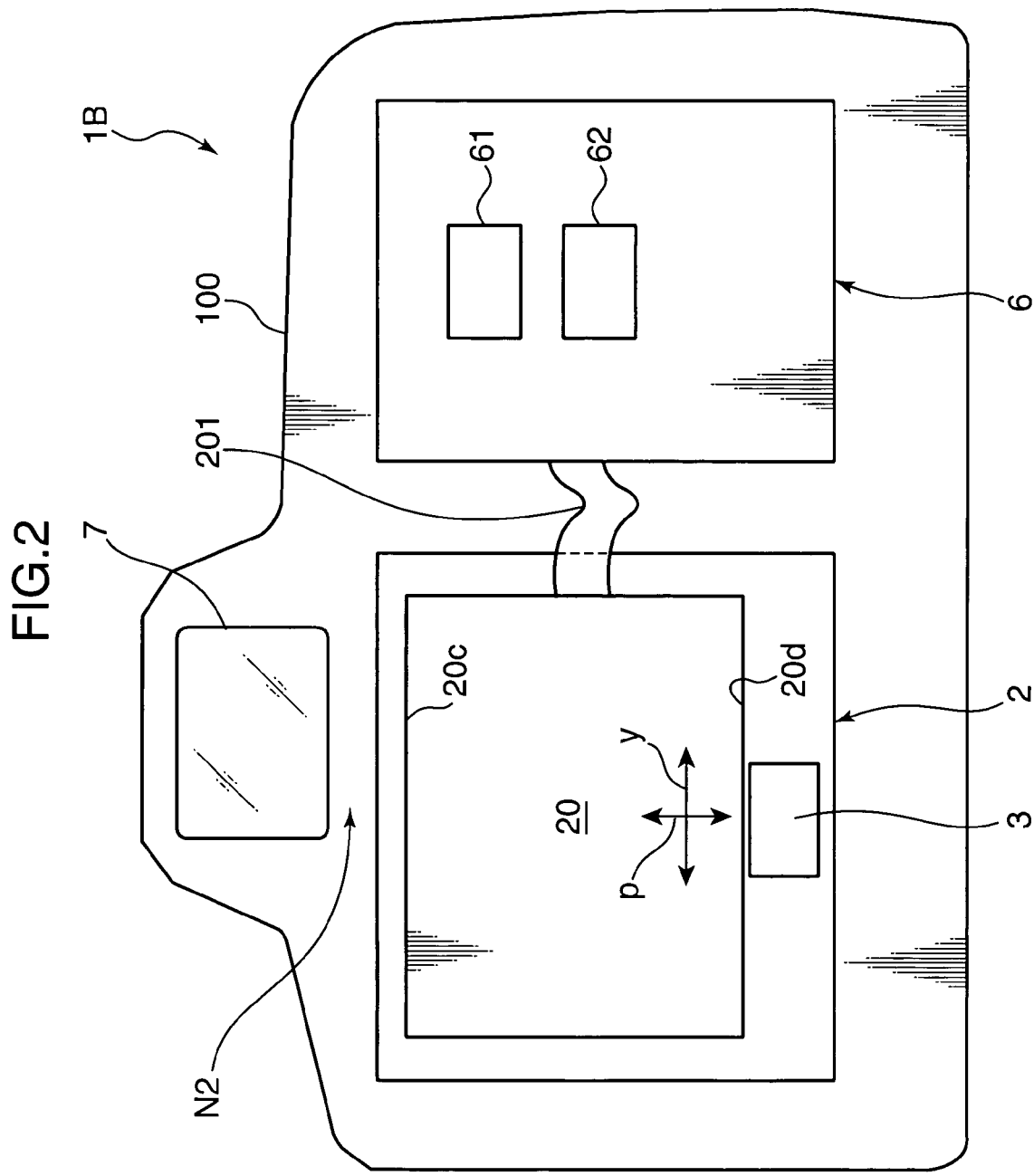
FIG. 2 is an illustration schematically showing arrangements (3) and (4) in the present invention.

FIG. 2 is an illustration schematically showing the arrangements (3) and (4). Referring to FIG. 2, a camera 1B accommodates, in a casing 100 of a camera body thereof, a shake correction unit 2 for oscillatingly supporting an image sensor 20, and a viewfinder section 7 for allowing a user to confirm a field to be photographed. The shake correction unit 2 and the viewfinder section 7 are arranged in proximity to each other on the planes substantially identical to each other. The shake correction unit 2 is provided with a driving section 3 on the side of a side portion of the image sensor 20 to apply an oscillating force to the image sensor 20 to oscillate the image sensor 20 in the first direction (pitch direction shown by the arrows p in FIG. 2) perpendicular to the optical axis, and in the second direction (yaw direction shown by the arrows y in FIG. 2) perpendicular to the optical axis and the first direction.

In the camera 1B having the arrangement (3) or (4), the driving section 3 is arranged on the side of the side portion 20d of the image sensor 20, namely, on the side opposite to a side portion 20c of the image sensor 20 in proximity to an adjoining portion N2 between the shake correction unit 2 and the viewfinder section 7. This arrangement eliminates providing a space for installing a driving section on the adjoining portion N2, whereby the shake correction unit 2 and the viewfinder section 7 can be arranged closer to each other. Thereby, the size of the camera in the height direction can be reduced. Generally, a metering sensor or a like device for auto focusing is provided at a lower portion of a casing in a single-lens reflex camera or the like. Such a camera has a relatively large size in the height direction. Therefore, arranging the driving section 3 on the side of the side portion 20d of the image sensor 20 in such a camera does not remarkably increase the height of the camera.

Thus, according to the above arrangements (3), (4), the camera can be miniaturized in the thickness and height directions thereof despite providing the shake correction unit in the camera.

(5) A camera with a shake correction mechanism according to still another embodiment of the present invention is a camera comprising: an image sensor in a rectangular shape defining four side portions to capture a light image of an object to be photographed; a shake detector to detect a shake of a main body of the camera; a shake correction unit including a first driving section to apply an oscillating force to the image sensor at one of the four side portions to oscillate the image sensor in a first direction perpendicular to an optical axis of the camera, and a second driving section to apply an oscillating force to the image sensor at another one of the four side portions to oscillate the image sensor in a second direction perpendicular to the optical axis and the first direction; a control circuit board loaded with electronic components thereon; and a viewfinder section to allow a user to confirm a field to be photographed, wherein the shake correction unit, the control circuit board, and the viewfinder section are arranged in proximity to each other on planes substantially identical to each other, the first driving section is arranged on a side of a second one of the four side portions opposite to a first one of the four side portions in proximity to an adjoining portion of the shake correction unit and the control circuit board, and the second driving section is arranged on a side of a fourth one of the four side portions opposite to a third one of the four side portions in proximity to an adjoining portion of the shake correction unit and the viewfinder section.

Figure 3:
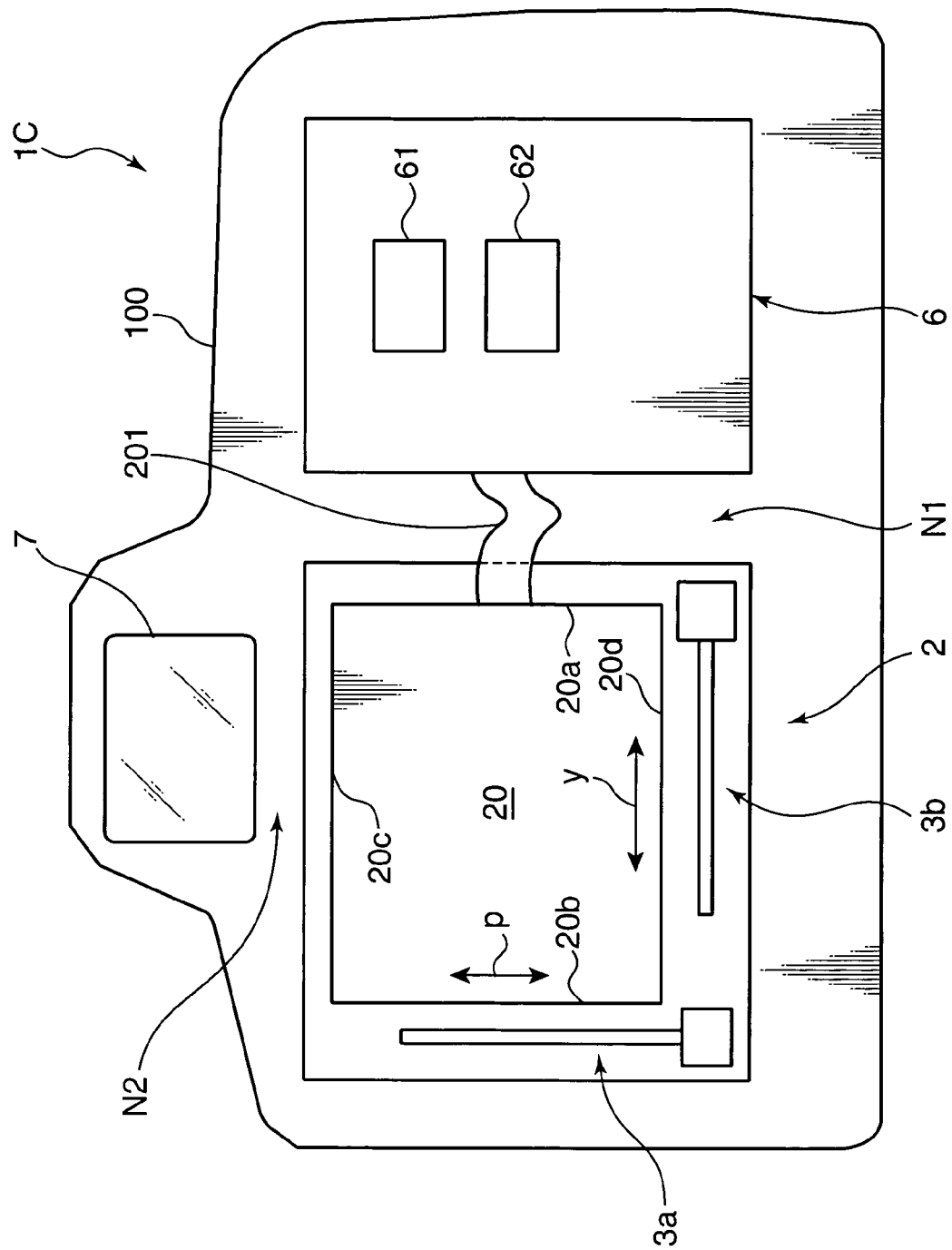
FIG. 3 is an illustration schematically showing an arrangement (5) in the present invention.

FIG. 3 is an illustration schematically showing the arrangement (5). Referring to FIG. 3, a camera 1C accommodates, in a casing 100 of a camera body thereof, a shake correction unit 2 for oscillatingly supporting an image sensor 20, a control circuit board 6 loaded with electronic components such as an ASIC 61 and a driving control circuit 62, and a viewfinder section 7 for allowing a user to confirm a field to be photographed. The shake correction unit 2, the control circuit board 6, and the viewfinder section 7 are arranged in proximity to each other on the planes substantially identical to each other. A first driving unit 3a for applying an oscillating force to the image sensor 20 to oscillate the image sensor 20 in the first direction (pitch direction shown by the arrows p in FIG. 3) perpendicular to the optical axis, and a second driving unit 3b for applying an oscillating force to the image sensor 20 to oscillate the image sensor 20 in the second direction (yaw direction shown by the arrows y in FIG. 3) perpendicular to the optical axis and the first direction are provided on the respective sides of side portions of the image sensor 20.

In the camera 1C having the arrangement (5), the first driving unit 3a is arranged on the side of a second side portion 20b of the image sensor 20, namely, on the side opposite to a first side portion 20a of the image sensor 20 in proximity to an adjoining portion N1 between the shake correction unit 2 and the control circuit board 6. Likewise, the second driving unit 3b is arranged on the side of a fourth side portion 20d of the image sensor 20, namely, on the side opposite to a third side portion 20c of the image sensor 20 in proximity to an adjoining portion N2 between the shake correction unit 2 and the viewfinder section 7. This arrangement eliminates providing a space for installing a driving unit on the adjoining portion N1, whereby the shake correction unit 2 and the control circuit board 6 can be arranged closer to each other. Thereby, the wiring by a flexible wiring substrate 201 can be shortened by the length corresponding to the space, and accordingly, the camera is less likely to be affected by noises. Further, since there is no need of providing a space for installing a driving unit on the adjoining portion N2, the shake correction unit 2 and the viewfinder section 7 can be arranged closer to each other. Thereby, the size of the camera in the height direction can be reduced.

Thus, according to the above arrangement, the camera can be miniaturized in the thickness, transverse, and height directions thereof despite providing the shake correction unit in the camera. Specifically, this arrangement secures an optimum positional arrangement while miniaturizing the camera in providing the shake correction unit in the camera constructed such that the driving units are arranged on the respective sides of the side portions of the image sensor. Furthermore, since the wiring by the flexible wiring substrate can be shortened, the camera is less likely to be affected by noises, and accordingly, high-quality image recording is accomplished.

(6) In any one of the arrangements (1), (2), and (5), it is preferable that the control circuit board is loaded with a semiconductor integrated circuit device for image processing.

As mentioned above, since analog signals that are likely to be affected by noises are transmitted from the image sensor 20 to the semiconductor integrated circuit device for image processing such as an ASIC via the flexible wiring substrate 201, this arrangement enjoys the benefits by the shortened wiring.

Thus, according to the above arrangement, since analog signals to be processed by the semiconductor integrated circuit device are less likely to be affected by noises, high-quality image recording is accomplished.

(7) In any one of the arrangements (3) through (5), preferably, the viewfinder section includes an optical viewfinder. In this arrangement, even if the shake correction unit 2 is built in the casing 100 of a single-lens reflex camera or the like, the height of the camera is not exceedingly increased. Accordingly, it is possible, for instance, to fabricate a digital single-lens reflex camera by incorporating the arrangement of a viewfinder employed in a silver halide camera, which contributes to reduction of the production cost of the camera.

(8) In any one of the arrangements (1) through (7), preferably, the driving section includes a piezoelectric actuator. This arrangement enables to produce a compact driving section which is operable with high precision, thereby allowing the shake correction unit to perform accurate shake correction without increasing the size of the shake correction unit.

(9) In any one of the arrangements (1), (2) and (5), preferably, the camera further comprises a connecting member to electrically connect the control circuit board and the image sensor.

In the following, preferred embodiments of the present invention are described in detail.

Figure 4A:
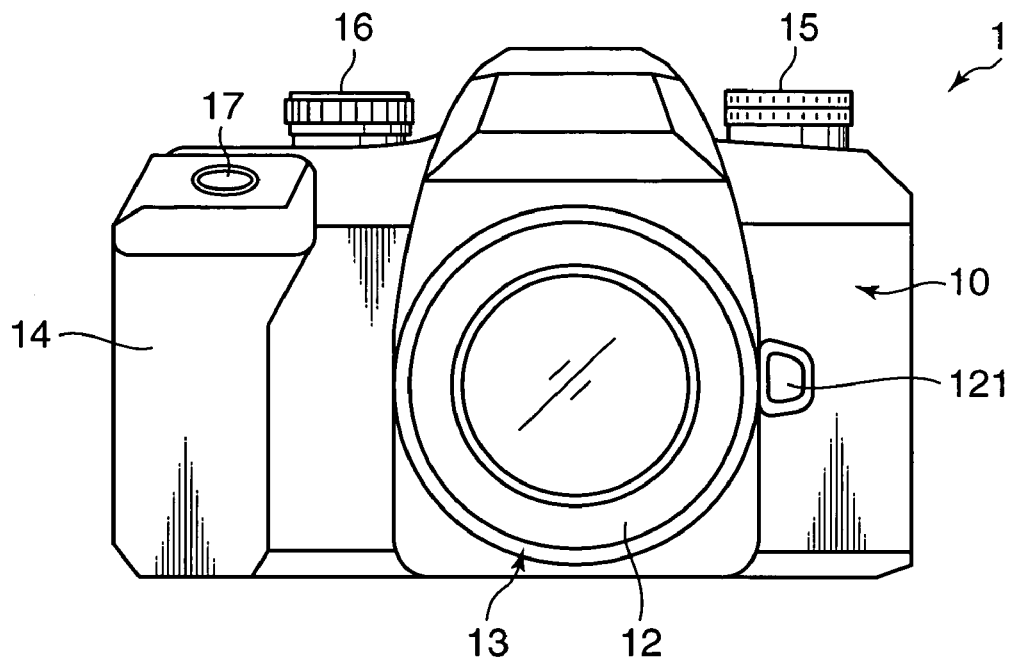
Figure 4B:
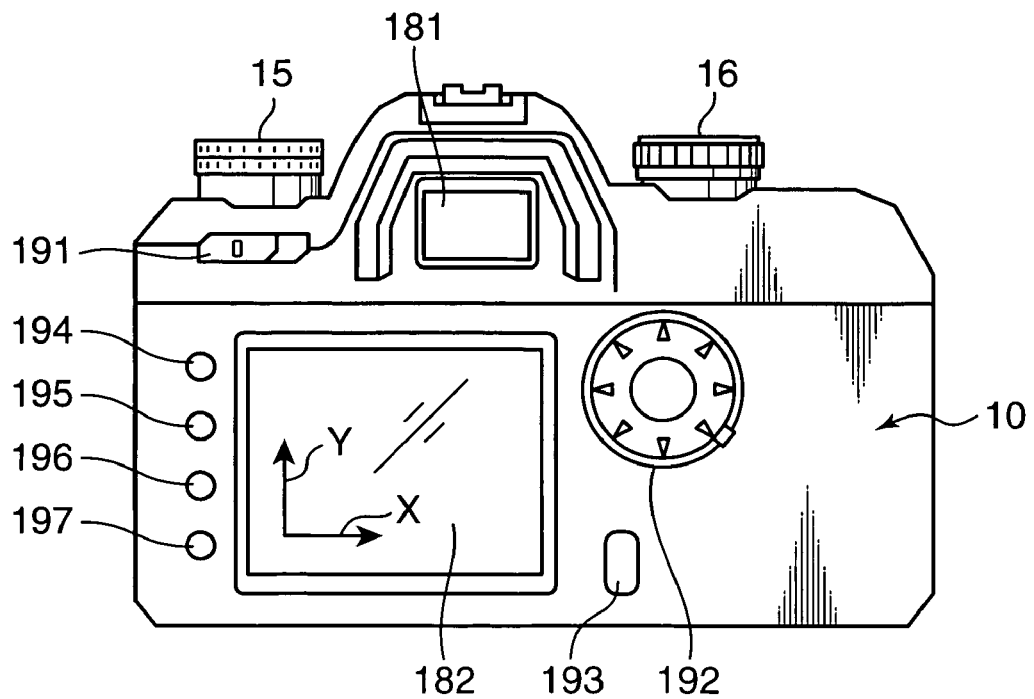

(Description on External Appearance of Camera) FIGS. 4A and 4B are illustrations each showing an external appearance of a digital camera 1 equipped with a shake correction mechanism as an embodiment of the present invention. FIG. 4A is a front view of the digital camera 1, and FIG. 4B is a rear view of the digital camera 1. As shown in FIG. 4A, the digital camera 1 is a single-lens reflex digital still camera provided with a camera body 10, and a taking lens 12 which is detachably attachable substantially in the middle on a front portion of the camera body 10. The taking lens 12 is exchangeable.

Referring to FIG. 4A, the camera body 10 has a mount portion 13 for mounting the taking lens 12 substantially in the middle on the front portion thereof, a grip portion 14 which protrudes forward on a left end portion on the front portion thereof for allowing a user to securely hold the camera 1 with his or her hand, a control value setting dial 15 arranged on an upper right portion of the camera body 10 for allowing the user to set a control value, a mode setting dial 16 arranged on an upper left portion of the camera body 10 for allowing the user to switch the photographing mode to a desired mode, and a release button 17 arranged on a top portion of the grip portion 14 for allowing the user to designate start or finish of photographing operation (exposure).

The taking lens 12 functions as a lens aperture for passing a light image of an object to be photographed, and includes a taking lens assembly such as a zoom lens block arrayed in series along an optical axis and fixed lens block for guiding the light image toward an image sensor 20 and a viewfinder section 7, which are arranged inside the camera body 10 and will be described later. The taking lens 12 can execute focus control by moving the positions of the respective lenses manually or automatically.

A detachment button 121 for allowing the user to detachably attach the taking lens 12, plural electric contacts (not shown) for electrically connecting the taking lens 12 with the camera body 10, and plural couplers (not shown) for mechanically connecting the taking lens 12 with the camera body 10 are provided in the vicinity of the mount portion 13. The electric contacts are adapted to send information inherent to the taking lens 12, such as f-number and focal length, from a lens read-only-memory (lens ROM 123, see FIG. 25) built in the taking lens 12 to a main controller in the camera body 10, and to send information regarding the positions of the focus lens and the zoom lens of the taking lens 12 to the main controller. The couplers are adapted to transmit a driving force of a drive motor provided in the camera body 10 for driving the focus lens to the respective lenses of the taking lens 12.

Referring to FIG. 4A, a battery chamber and a card chamber are formed in the grip portion 14. A predetermined number of batteries, such as AA size batteries are housed in the battery chamber as a power source for the camera. A recording medium for recording image data of photographed images, e.g., a memory card is detachably mountable in the card chamber.

The mode setting dial 16 is adapted to set various photographing modes such as auto-exposure (AE) control mode, auto-focusing (AF) control mode, still image photography mode for photographing still images, moving image photography mode (continuous photography mode) for photographing moving images, and flash mode.

The release button 17 is a depressing type switch, and is settable to a halfway pressed state where the release button 17 is pressed halfway down, and to a fully pressed state where the release button 17 is pressed fully down. When the release button 17 is pressed halfway down in the still image photography mode, a preparatory operation for photographing a still image of an object such as setting an exposure control value and focal adjustment is executed. Subsequently, when the release button 17 is pressed fully down, a photographing operation, namely, a series of operations comprising exposing a color image sensor to light, processing image signals acquired by the exposure, and recording the processed signals in the memory card, are executed. On the other hand, when the release button 17 is pressed fully down in the moving image photography mode, a photographing operation, namely, a series of operations comprising exposing the color image sensor to light, processing image signals acquired by the exposure, and recording the processed signals in the memory card are executed. Subsequently, when the release button 17 is pressed fully down again, the photographing operation is terminated.

Referring to FIG. 4B, a viewfinder window (eyepiece portion) 181 is formed in an upper portion substantially in the middle on a rear portion of the camera body 10. The light image of the object passing through the taking lens 12 is guided to the viewfinder window 181. A user (photographer) can view the object image through the viewfinder window 181. An external display section 182 such as an LCD monitor is formed substantially in the middle on the rear portion of the camera body 10. The external display section 182 is a color liquid crystal display device having pixels in the number of 400 (in X-direction corresponding to horizontal direction)×300 (in Y-direction corresponding to vertical direction)=120,000 in this embodiment, and is adapted to display a menu screen for allowing the user to set the AE/AF control mode, still image/moving image photography mode, or other photographing conditions, and to display photographed images that have been recorded in the memory card for playback in the playback mode, as well as displaying the moving images.

A power switch 191 is provided on an upper left portion of the external display section 182. The power switch 191 is, for instance, a slide switch of 2-contact. When the contact of the switch 191 is set to "OFF" position on the left side of the switch 191, the power of the camera 1 is turned off, and when the contact of the switch 191 is set to "ON" position on the right side of the switch 191, the power of the camera 1 is turned on. A direction selecting key 192 and a shake correction switch 193 are provided on the right side of the external display section 182. The direction selecting key 192 is a circular operation button. Upward, downward, leftward, and rightward directions, and upward right, upward left, downward right, and downward left directions are detectable with use of the direction selecting key 192. The direction selecting key 192 has multi-functions. For instance, the direction selecting key 192 functions as an operation switch for allowing the user to alter the item selected on the menu screen displayed on the external display section 182 for setting a desired photographic scene, and also functions as an operation switch for allowing the user to alter the selected frame of an image for playback on an index image screen where plural thumbnail images are displayed in a certain order. The direction selecting key 192 also functions as a zoom switch for allowing the user to change the focal length of the zoom lens of the taking lens 12.

The shake correction switch 193 is adapted to set a shake correction mode that enables to perform photographing free of image blur even in a condition that such an image blur may take place due to shake of the camera body 10 or the like, e.g., one-hand photographing, telephotographing, or photographing in a dark place where long time exposure is required. The shake correction switch 193 may be a slide switch of 2-contact as employed in the power switch 191.

A cancel switch 194, a determination switch 195, a menu display switch 196, and an external display changeover switch 197 are provided on the left side of the external display section 182 for allowing the user to designate display on the external display section 182 and to manipulate display contents displayed on the external display section 182. The cancel switch 194 is a switch for allowing the user to cancel the contents selected on the menu screen. The determination switch 195 is a switch for allowing the user to determine the contents selected on the menu screen. The menu display switch 196 is a switch for allowing the user to display the menu screen on the external display section 182 or to change over the contents of the menu screen between a photographic scene setting screen and a mode setting screen regarding exposure control, for instance. Each time the menu display switch 196 is depressed, the contents of the menu screen is changed. The external display changeover switch 197 is a switch for allowing the user to turn on and off the display of the external display section 182. Each time the external display changeover switch 197 is depressed, display on the external display section 182 is alternately turned on and off. Various switches of push button type or dial switches, other than the above switches, such as a zoom switch, an exposure correction switch, and an AE lock switch may be provided at appropriate positions on the camera body 10.

Figure 5:
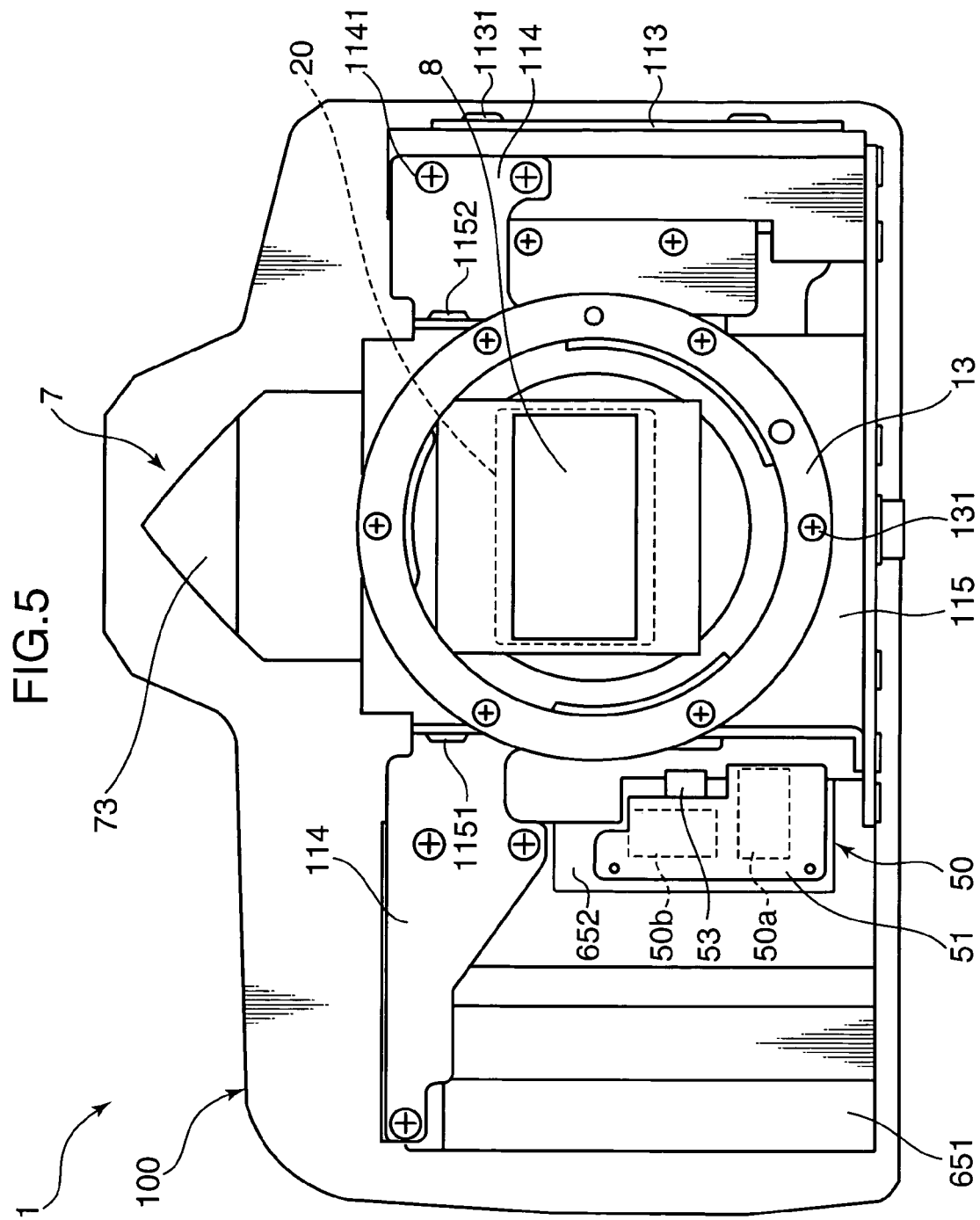
FIG. 5 is a perspective front view of the digital camera.
Figure 6:
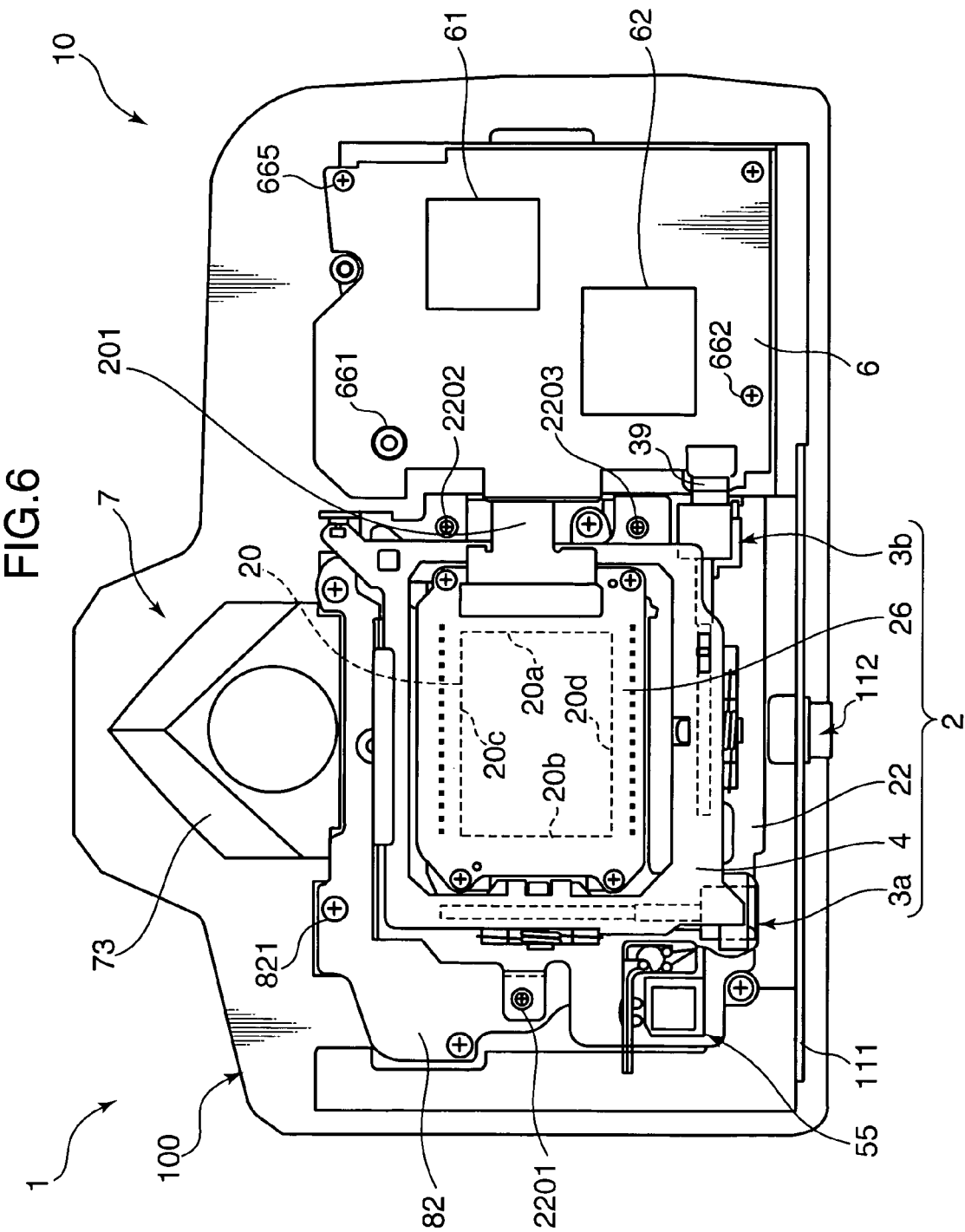
FIG. 6 is a perspective rear view of the digital camera.
Figure 7:
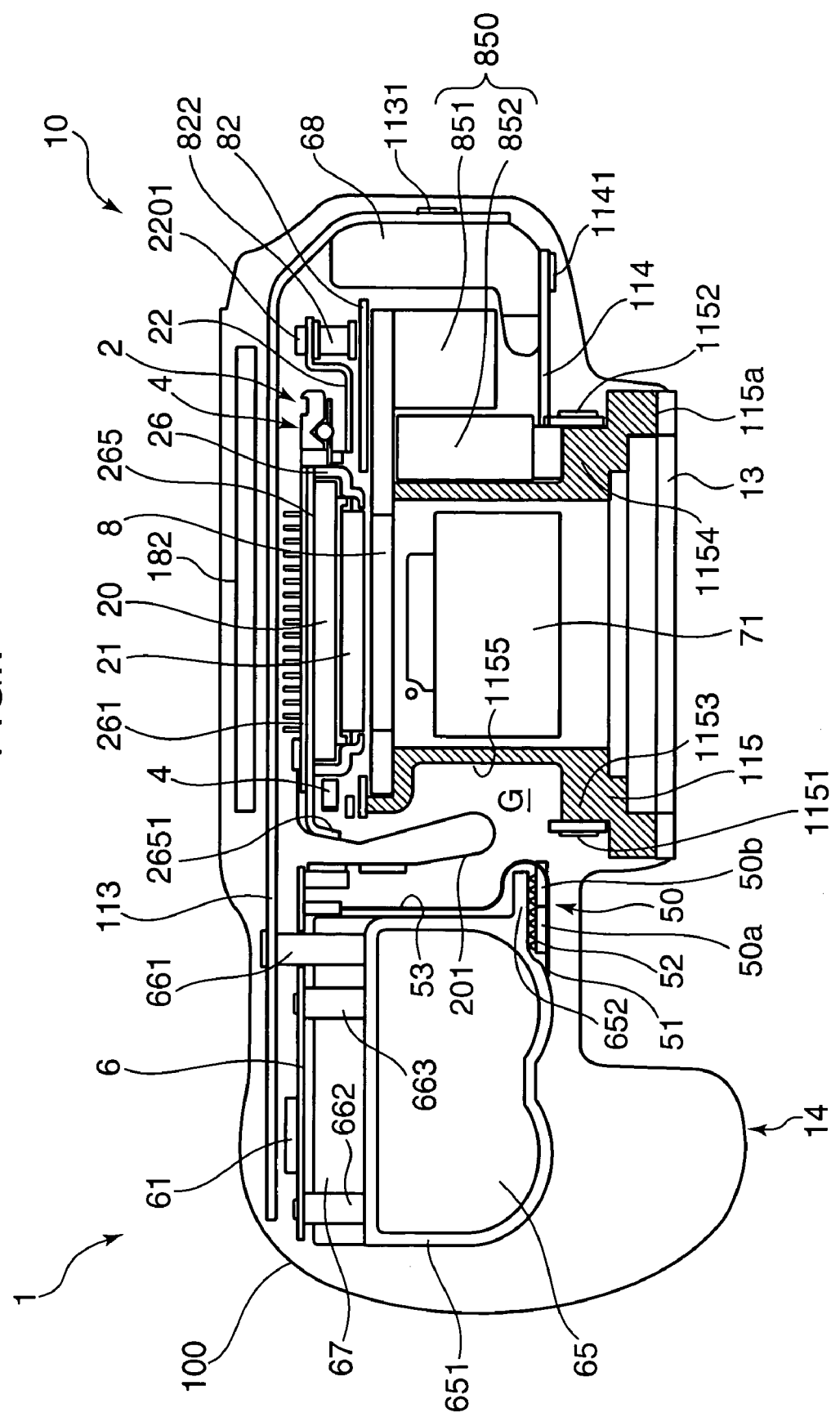
FIG. 7 is a cross-sectional top plan view of the digital camera

(Description on Internal Arrangement of Camera) Next, an internal arrangement of the digital camera 1 is described. FIGS. 5, 6, 7, and 8 are a perspective front view, a perspective rear view, a cross-sectional top plan view, and a cross-sectional side view of the digital camera 1. It should be noted that FIGS. 5 and 6 are perspective views, and FIG. 7 is a cross-sectional view each showing a state that the taking lens 12 is omitted.

Figure 8:
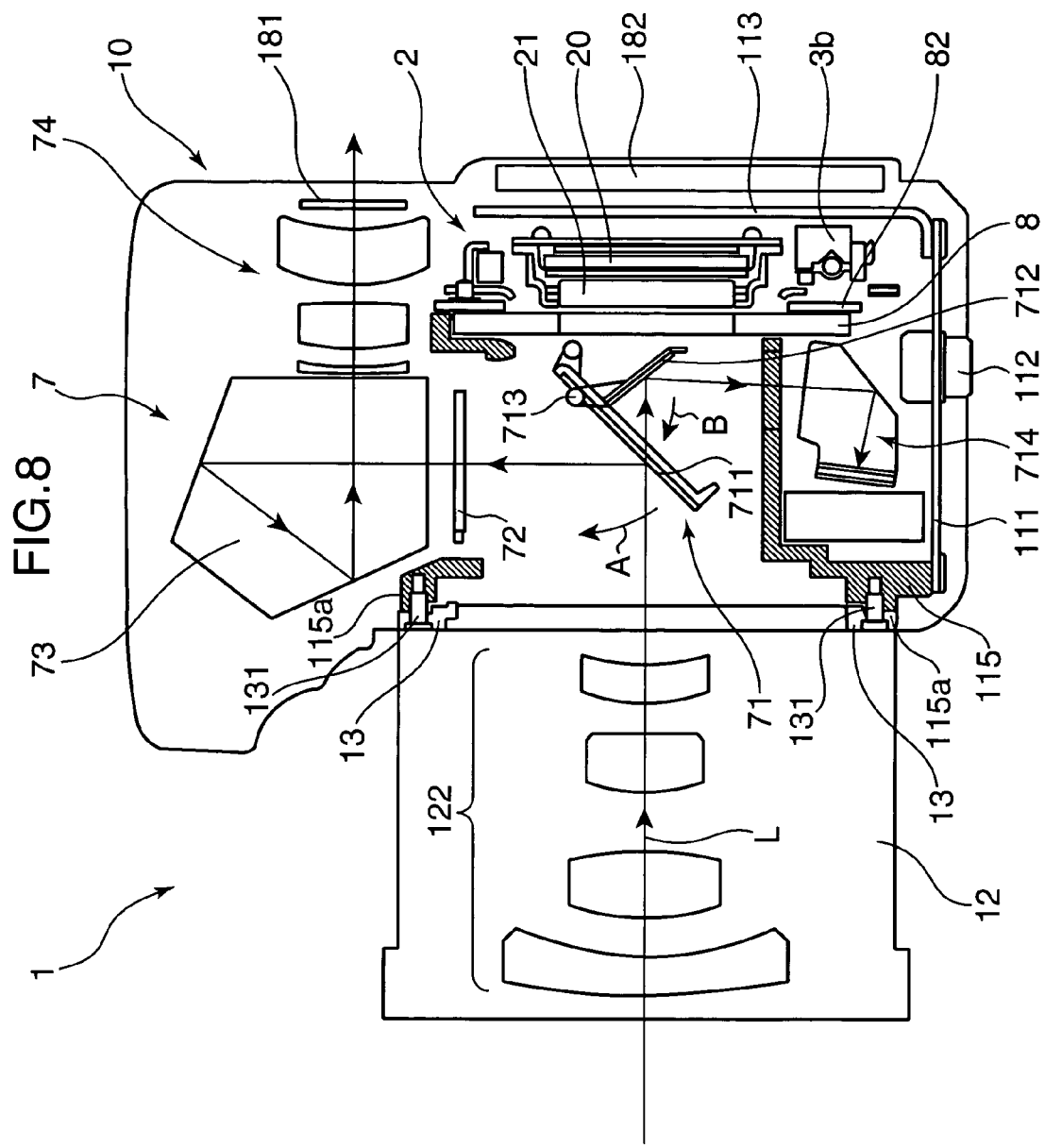
FIG. 8 is a cross-sectional side view of the digital camera.

As shown in FIG. 8, the taking lens 12 is mounted on the camera body 10 of the digital camera 1. As shown in FIGS. 5 through 8, the camera body 10 accommodates, in a casing 100 thereof, the image sensor 20 of a rectangular shape in plan view for capturing a light image of an object, a shake correction unit 2 including a driving section (actuators 3a, 3b) for applying an oscillating force to the image sensor 20 to oscillate the image sensor 20 in a direction perpendicular to the optical axis, a shake detecting section 50 for detecting a shake of the camera body 10, a position detecting section 55, a control circuit board 6 on which electronic components such as an ASIC 61 provided with various circuits for image processing, and a driving control circuit 62 of the driving section are mounted, the battery chamber 65, the card chamber 67, a connector portion 68, the viewfinder section 7 for allowing the user to confirm a field to be photographed, a mirror section 71, a frame member 115 for encasing the mirror section 71, a shutter 8, and the other parts in such a manner that these parts are fixedly and integrally supported on a bottom chassis 111, a side chassis 113, a front chassis 114, and the like. As will be described later, the image sensor 20 and part of the shake correction unit 2 are not rigidly fixed to these chassis to allow the image sensor 20 and the part of the shake correction unit 2 to freely oscillate.

As shown in FIGS. 5 and 8, the image sensor 20 is arranged inside the camera body 10 as opposed to the taking lens 12 at an appropriate position on the optical axis L (see FIG. 8) of a lens group 122 of the taking lens 12 which is detachably attached to the camera body 10. The image sensor 20 has a sensing plane extending in a direction perpendicular to the optical axis L.

The image sensor 20 is adapted to detect brightness of an object to be photographed, namely, to capture the light image of the object. Specifically, the image sensor 20 photoelectrically converts the received light amount of the object light image formed through the taking lens 12 to image signals of color components of red, green, and blue for outputting the signals to the ASIC 61 of the control circuit board 6. More specifically, the image sensor 20 has a rectangular shape in plan view, and comprises a single CCD color area sensor of a so-called "Bayer matrix" in which patches of color filters each in red (R), green (G), and blue (B) are attached on respective surfaces of charge coupled devices (CCDs) arrayed in two dimensions, e.g., 1,600 in X-direction and 1,200 in Y-direction, namely, 1,920,000 charge coupled devices (pixels) in total. Examples of the image sensor 20 are a CCD image sensor, a CMOS image sensor, and a VMIS image sensor. In this embodiment, the image sensor 20 is a CCD image sensor.

The shake correction unit 2 is adapted to correct misalignment of the optical axis L by optionally moving (oscillating) the image sensor 20 depending on a shake of the camera body 10 in the case where the shake of the camera body 10 takes place due to hand shake of the user or the like. The shake correction unit 2 is comprised of a shake correction bedplate 22, an image sensor holder 26, the driving section including the actuator 3a for oscillating the image sensor 20 in the pitch direction (hereinafter, called as "pitch actuator 3a") and the actuator 3b for oscillating the image sensor 20 in the yaw direction (hereinafter, called as "yaw actuator 3b"), a slider 4, and the position detecting section 55. The construction of the shake correction unit 2 will be described later in detail.

The control circuit board 6 and the shake correction unit 2 are arranged in proximity to each other on planes substantially identical to each other (see FIGS. 6 and 7). In this embodiment, a battery holder 651 with the battery chamber 65 formed therein is fixedly mounted on the side chassis 113 by way of an interlocking portion 661, and the control circuit board 6 is screwed to the battery holder 651 by screws 662, 663. The control circuit board 6 and the image sensor 20 are electrically connected with each other by the flexible wiring substrate 201. The control circuit board 6, the pitch actuator 3a, the yaw actuator 3b, and the position detecting section 55 are electrically connected with each other by a second flexible wiring substrate 39.

The flexible wiring substrate 201 and the second flexible wiring substrate 39 each is a strip-like wiring member constructed such that plural conducting members extending in a transverse direction of the digital camera 1 are arrayed in a vertical direction by a predetermined interval, with upper and lower surfaces of the flexible wiring substrate 201 (and the second flexible wiring substrate 39) being covered with an insulating film. The flexible wiring substrate 201 (39) is connected with the relevant parts with its large width portion being flexed. Particularly, the flexible wiring substrate 201 is connected with the relevant parts with a certain flexure to cope with oscillation of the shake correction unit 2. It is possible to use a wire harness provided with a bundle of round wires in place of the strip-like flexible wiring substrate.

The battery holder 651 is arranged on the same side as the grip portion 14 of the camera body 10, and is made of a resin molded material such as plastic. A predetermined number of batteries, such as AA size batteries are housed in the battery chamber 65 as a power source for driving the digital camera 1. The card chamber 67 is formed in the rear portion of the battery holder 651. A memory card or a like device is detachably mountable in the card chamber 67 for recording image data of photographed images therein.

The shake detecting section 50 includes a pitch gyro 50a, a yaw gyro 50b, a gyro plate 51, a shock absorbing member 52, and a flexible wiring substrate 53 adapted for the gyros. The pitch gyro 50a and the yaw gyro 50b are each adapted to detect an angular velocity of an object to be measured (in this embodiment, the camera body 10) when the camera body 10 is swung by an impact applied to the camera body 10. An exemplified gyro is constructed such that a certain voltage is applied to a piezoelectric device to oscillate the piezoelectric device, and distortion arising from Coriolis action that is generated when an angular velocity due to swing of the camera body 10 is applied to the oscillating piezoelectric device is read as an electric signal.

As shown in FIGS. 5 and 7, the pitch gyro 50a and the yaw gyro 50b are mounted on the gyro plate 51 via the shock absorbing member 52. The gyro plate 51 is attached to a gyro attachment portion 652 having a planar shape and formed on a side wall of the battery holder 651. The shock absorbing member 52 is adapted to keep the gyros from erroneously detecting vibration of the mirror section 71, and may be a sheet member made of butyl rubber formed with adhesive layers on both surfaces thereof. The gyro flexible wiring substrate 53 is adapted to electrically connect the pitch gyro 50a and the yaw gyro 50b with the control circuit board 6.

The connector portion 68 is arranged transversely on the opposite side of the battery holder 651, is made of a resin molded material, and is formed with a housing for a remote terminal or a USB terminal, or with an input jack of an AC power source. As shown in FIG. 7, the connector portion 68 is fixed to the side chassis 113 by a screw 1131, and is fixed to the front chassis 114 by a screw 1141, respectively.

The frame member (front frame) 115 is arranged substantially in the middle of the camera body 10 in between the battery holder 651 and the connector portion 68. The frame member 115 has a box-like structure having a substantially square shape in front view with an opening formed in an upper portion thereof as opposed to the viewfinder section 7. The frame member 115 has a sufficient rigidity against flexure or a like external force. The frame member 115 has a cylindrical mount receiving portion 115a having a configuration substantially identical to the shape of the mount portion 13. The mount portion 13 is fittingly received in the mount receiving portion 115a, and is fixed thereto by plural screws 131. The frame member 115 is fixed to a bent portion of the front chassis 114 at fixing portions 1153, 1154 formed on side portions of the frame member 115 near the mount receiving portion 115a by screws 1151, 1152, respectively. (See FIGS. 5 and 7).

Referring to FIG. 8, the mirror section (reflective plate) 71 is arranged on the optical axis L with a face thereof oriented to reflect the object light image toward the viewfinder section (viewfinder optical assembly) 7. The object light image that has passed through the taking lens 12 is reflected upward by the mirror section 71, specifically by a main mirror 711 to be described later, and is imaged on a focusing glass 72. Part of the object light image that has passed through the taking lens 12 is transmitted through the mirror section 71. The mirror section 71 is arranged inside the frame member 115 and is supported by the frame member 115 by an unillustrated support mechanism.

The mirror section 71 includes the main mirror 711 and a sub mirror 712. The sub mirror 712 is arranged on the rear side of the main mirror 711 and is rotatably tilted toward the rear surface of the main mirror 711. Part of the object light image passing through the main mirror 711 is reflected on the sub mirror 712, and the reflected object light image is incident on a focus detecting section 714. The focus detecting section 714 is a so-called AF sensor constituted of a metering device or the like for detecting information as to whether the object light image has been focused.

The mirror section 71 is a so-called quick return mirror. During exposure, the mirror section 71 is quickly pivoted upward in the direction shown by the arrow A in FIG. 8 about an axis of rotation of a rotary shaft 713, and is retained at a certain position below the focusing glass 72. At this time, the sub mirror 712 is pivoted in the direction shown by the arrow B in FIG. 8 about the axis of rotation of the rotary shaft 713 on the rear side of the main mirror 711. When the main mirror 711 is retained at the position below the focusing glass 72, the sub mirror 712 is folded substantially in parallel with the main mirror 711. As a result, the image sensor 20 is exposed to the object light image passing through the taking lens 12 without being blocked by the mirror section 71. When the exposure is finished, the mirror section 71 is returned to the initial position shown by the solid line in FIG. 8.

As shown in FIGS. 5, 6 and 8, the viewfinder section 7 is arranged above the frame member 115. The viewfinder section 7 includes a penta prism 73, an eyepiece lens 74, and the viewfinder window 181. The penta prism 73 has a pentagonal shape in cross section, and is a prism member for forming the object light image that has been incident on the viewfinder section 7 from the lower part thereof into an upright image by turning the light image upside down through internal reflection. The eyepiece lens 74 guides the upright object light image outside of the camera body 10 through the viewfinder window 181. With this arrangement, the viewfinder section 7 functions as an optical viewfinder during a photography standby operation.

Referring to FIG. 8, a low pass filter (optical filter) 21 is arranged on the optical axis L in front of the image sensor 20 to prevent pseudo color image formation or generation of moiré in color images. The low pass filter 21 is supported on the image sensor holder 26 together with the image sensor 20.

The shutter (mechanical shutter) 8 is arranged in front of the low pass filter 21. The shutter 8 is controllably opened and closed as timed with the exposure. In this embodiment, the shutter 8 is, for instance, a vertically traveling focal plane shutter, with a forward portion thereof being brought into contact with a rear end portion of the frame member 115, and a rear portion thereof being pressed against a shutter pressing plate 82. The shutter pressing plate 82 is fixed to the frame member 115 by a screw 821 (see FIG. 6). With this arrangement, the shutter 8 is supported on the rigid frame member 115.

As shown in FIGS. 7 and 8, the external display section 182 is arranged behind the image sensor 20 in parallel therewith, with the side chassis 113 interposing between the external display section 182 and the image sensor 20. A driving unit 850 (see FIG. 7) is arranged between the frame member 115 and the connector portion 68 to drive the mirror section 71 and the shutter 8. The driving unit 850 includes a shutter driving section 851 for drivingly opening and closing the shutter 8, and a mirror driving section 852 for driving the mirror section 71. The mirror driving section 852 has a function of partly driving the shutter 8.

Observing the above arrangement in terms of an interlock mechanism of interlocking structural units, the shutter 8 and the shake correction unit 2 are mounted on the rear end portion of the frame member 115, and are interlocked with each other on the front chassis 114 by the screws 1151, 1152 at the forward portion of the frame member 115, namely, on the fixing portions 1153, 1154. The connector portion 68 is mounted on the front chassis 114 by the screw 1141. Thereby, the frame member 115 and the connector portion 68 are interlocked with each other on the front chassis 114. Further, the connector portion 68, and the battery holder 651 integrally assembled with the control circuit board 6 are interlocked with each other on the side chassis 113 by way of the screw 1131 and the interlocking portion 661. The frame member 115 and the connector portion 68 are interlocked to each other by the bottom chassis 111, as well as the side chassis 113. The bottom chassis 111 is formed with a screw portion 112 for mounting a tripod.

With the interlock mechanism for interlocking the structural units, even if vibration is generated by driving of the mirror section 71, there is no likelihood that the vibration is directly transmitted to the shake detecting section 50 mounted on the gyro attachment portion 652 formed on the battery holder 651, because the vibration is attenuated while being absorbed by the chassis. Thereby, an influence to the shake detecting section 50 can be Further, the above interlock mechanism makes it easier to define a predetermined hollow portion G (see FIG. 7) between a structural unit comprised of the frame member 115 and the shake correction unit 2, and a structural unit comprised of the control circuit board 6 and the battery holder 651. Specifically, since an interlock portion for interlocking the frame member 115 and the battery holder 651 is not required, and the driving unit 850 is arranged on the same side as the connector portion 68, a planar hollow portion extending along a side wall portion 1155 (see FIG. 7) of the box-like frame member 115 is secured. In this embodiment, as shown in FIG. 7, the planar hollow portion G having the dimension sufficient to accommodate the flexible wiring substrate 201 in a flexed state is defined around the side wall portion 1155, and the flexible wiring substrate 201 in the flexed state is connectable with the relevant parts in the planar hollow portion G.

With this arrangement, the flexible wiring substrate 201 is movable following two-dimensional oscillation of the image sensor 20.

(Schematic Description on Shake Correction Unit) Now, the shake correction unit 2 in this embodiment is described in detail.

Figure 9:
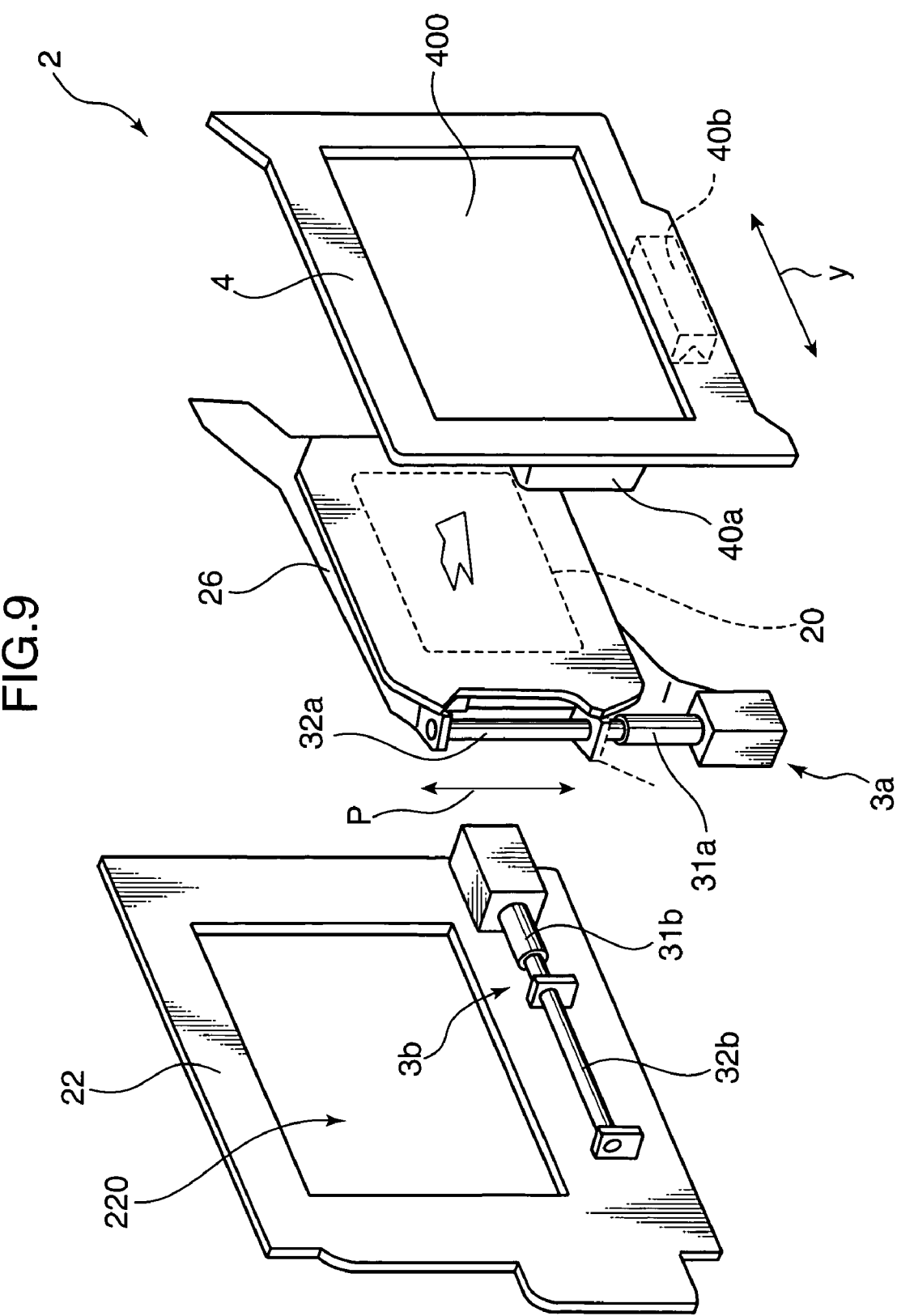
FIG. 9 is an exploded perspective view schematically showing an arrangement of a shake correction unit load in the digital camera.

FIG. 9 is an exploded perspective view schematically showing the arrangement of the shake correction unit 2. The shake correction unit 2 primarily has three base plate members, namely, the shake correction bedplate 22, the image sensor holder 26, and the slider 4. The image sensor holder 26 and the slider 4 each serving as a movable base plate member are placed one over the other on the shake correction bedplate 22 serving as a fixed base plate member.

As shown in FIG. 7 or FIG. 8, the image sensor holder 26 is a movable base plate member on which the image sensor 20 and the low pass filter 21 are supported. The shake correction bedplate 22 is a fixed base plate member for mounting the shake correction unit 2 in the camera body 10. As shown in FIG. 9, the shake correction bedplate 22 is formed with a rectangular opening 220 having a shape substantially identical to the outer configuration (rectangular shape) of the image sensor 20, so that the object light image is incident on the image sensor 20 through the shutter 8. The slider 4 is a movable base plate member having a rectangular frame with an opening 400 having a shape substantially identical to the outer configuration of the image sensor 20.

The pitch actuator 3a (first driving unit) is loaded on a side portion of the image sensor holder 26 corresponding to a side portion of the image sensor 20. The pitch actuator 3a is a piezoelectric actuator comprising a piezoelectric device 31a and a rod 32a, which will be described later. A frictional engaging portion 40a is formed on a side portion of the slider 4 to frictionally engage the rod 32a. The image sensor holder 26 is oscillated relative to the slider 4 in the pitch direction shown by the arrows p in FIG. 9 when the rod 32a is driven by the piezoelectric device 31a. In other words, an oscillating force to oscillate the image sensor 20 in the first direction (pitch direction) perpendicular to the optical axis L of the digital camera 1 is applied to the image sensor 20 at the second side portion 20b of the image sensor 20.

The yaw actuator 3b (second driving unit) comprising a piezoelectric device 31b and a rod 32b is loaded on a side portion of the shake correction bedplate 22 serving as a fixed base plate member. A frictional engaging portion 40b is formed on another side portion of the slider 4 to frictionally engage the rod 32b. The slider 4 is oscillated relative to the shake correction bedplate 22 in the yaw direction shown by the arrows y in FIG. 9 when the rod 32b is driven by the piezoelectric device 31b. In other words, an oscillating force to oscillate the image sensor 20 in the second direction (yaw direction) perpendicular to the optical axis L of the digital camera 1 and the first direction (pitch direction) is applied to the image sensor 20 at the fourth side portion 20d of the image sensor 20.

Since the oscillation mechanism comprised of the pitch actuator 3a and the yaw actuator 3b is provided, the image sensor 20 is movable in the pitch direction and the yaw direction. Thus, the image sensor 20 is oscillated depending on a shake of the camera body 10. A desired shake correction is executed by causing the shake detecting section 50 to detect shake amounts in the pitch direction and the yaw direction and by optionally driving the pitch actuator 3a and/or the yaw actuator 3b based on the detection result.

Concerning the positional relation between the pitch actuator 3a and the yaw actuator 3b, the arrangement described referring to FIG. 3 is adopted. Specifically, as shown in FIG.

6, the pitch actuator 3a (first driving unit) is arranged on the side of the second side portion 20b opposing the first side portion 20a of the image sensor 20 in the vicinity of the adjoining portion between the shake correction unit 2 and the control circuit board 6, namely, on the side of the side portion 20b transversely opposite to the side portion 20a of the image sensor 20. The yaw actuator 3b (second driving unit) is arranged on the side of the fourth side portion 20d opposing the third side portion 20c of the image sensor 20 in the vicinity of the adjoining portion between the shake correction unit 2 and the viewfinder section 7, namely, on the side of the side portion 20d vertically opposite to the side portion 20c of the image sensor 20.

With this arrangement, there is no need of providing a space for installing an actuator in the adjoining portion between the shake correction unit 2 and the control circuit board 6, whereby the shake correction unit 2 and the control circuit board 6 can be arranged closer to each other, and the wiring by the flexible wiring substrate 201 can be shortened by the length corresponding to the space. Thus, the camera is less likely to be affected by noises. Further, there is no need of providing a space for installing an actuator on the adjoining portion between the shake correction unit 2 and the viewfinder section 7, whereby the shake correction unit 2 and the viewfinder section 7 can be arranged closer to each other. This arrangement enables to reduce the height of the camera.

(Description on Components of Shake Correction Unit)

Figure 10:
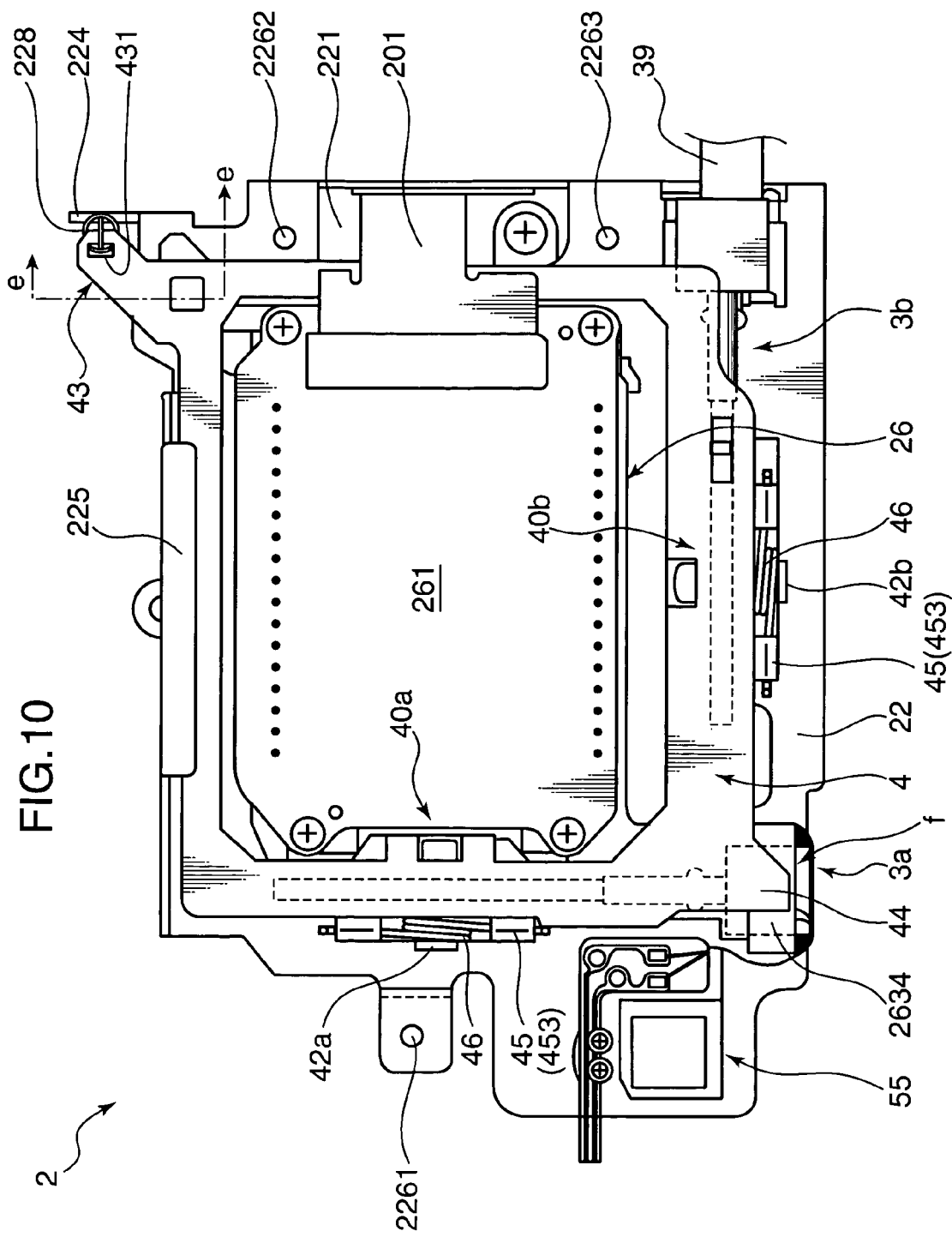
FIG. 10 is a plan view of the shake correction unit in an assembled state.
Figure 11:
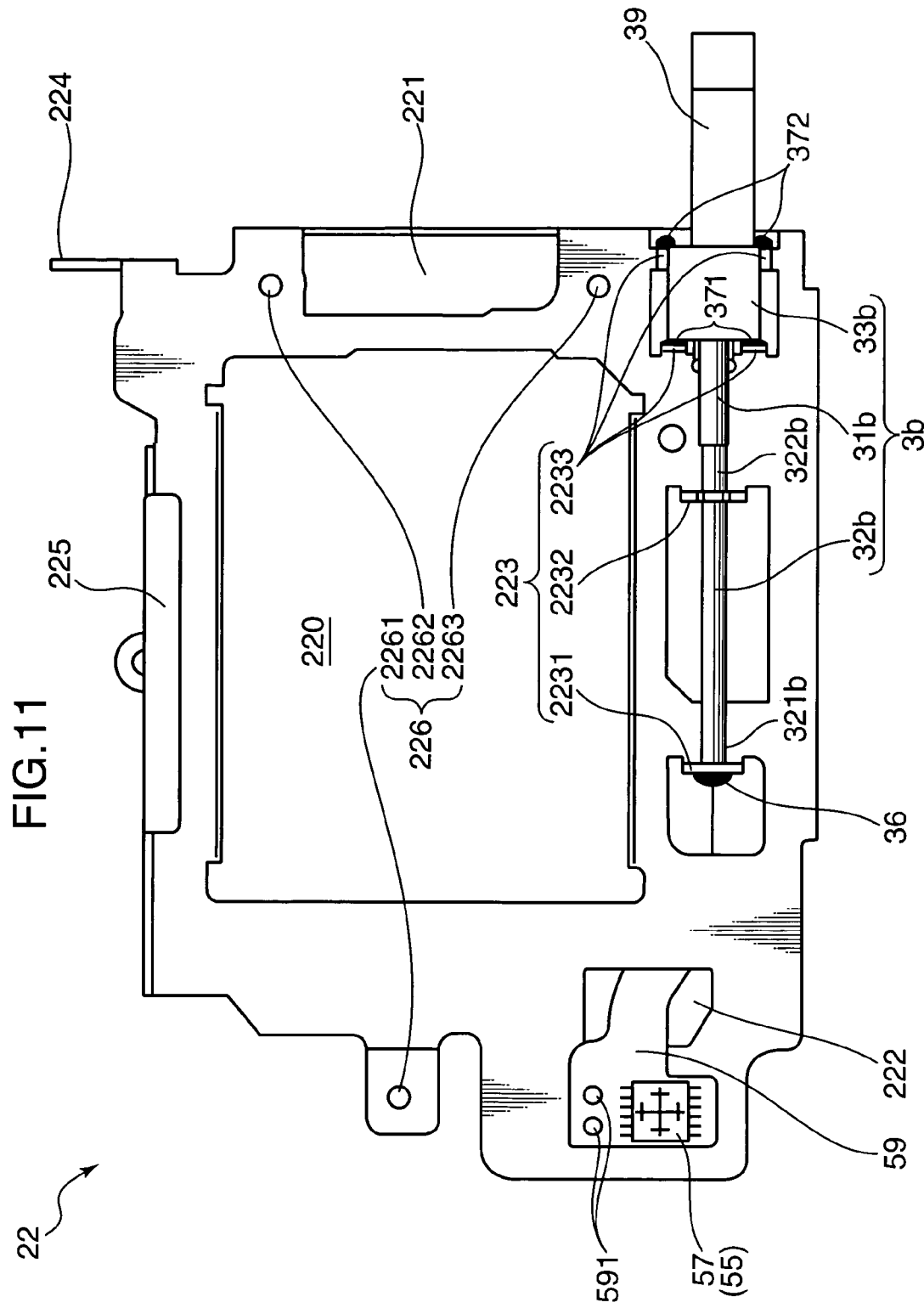
FIG. 11 is a plan view showing a shake correction bedplate of the shake correction unit.

Now, the respective components of the shake correction unit 2 are described. FIG. 10 is a plan view of the shake correction unit 2 showing a state that the three base plate members, namely, the shake correction bedplate 22, the image sensor holder 26, and the slider 4 shown in FIG. 9, are assembled to each other. FIG. 11 is a plan view of the shake correction bedplate 22, FIG. 12 is a plan view of the image sensor holder 26, and FIG. 13 is a plan view of the slider 4.

<Shake Correction Bedplate> Referring to FIG. 11, the shake correction bedplate 22 includes, in addition to the opening 220, a first wiring window 221 for passing the flexible wiring substrate 201, a second wiring window 222 for passing a flexible wiring substrate 59 adapted for a hall sensor 57 for position detection, which will be described later, an actuator mounting portion 223 on which the yaw actuator 3b is fixed, a first interlock spring mounting portion 224, a stopper frame 225 for keeping the slider 4 from coming off at the time of exertion of an impact or the like, and screw holes 226 for receiving adjustment screws 2201, 2202, 2203 (see FIGS. 6 and 23) which serve as members for fastening the shake correction unit 2 to the camera body 10, and also serve as members for adjusting an angular position of the shake correction unit 2 relative to the optical axis.

The yaw actuator 3b mounted on the actuator mounting portion 223 comprises the piezoelectric device 31b, the rod 32b, and a weight member 33b having a rectangular shape in plan view. The actuator mounting portion 223 includes a lead end mounting portion 2231 in the form of a bent piece formed with a through-hole for supporting a lead end portion 321b of the rod 32b, an intermediate mounting portion 2232 in the form of a bent piece formed with a through-hole for holding the vicinity of a base portion 322b of the rod 32b, and weight mounting portions 2233 in the form of four upright bent pieces for fittingly receiving the weight member 33b. The lead end portion 321b of the rod 32b is fixed to the lead end mounting portion 2231 by an elastic adhesive 36. The weight member 33b is fixed to the forward two weight mounting portions 2233 at a forward portion (on the side of the rod 32b) thereof by an elastic adhesive 371, and is fixed to the rearward two weight mounting portions 2233 at a rearward portion thereof by an elastic adhesive 372.

In this embodiment, the yaw actuator 3b (pitch actuator 3a) is a piezoelectric actuator. The construction and the operation of the actuator are described referring to FIGS. 14A through 15. As shown in FIG. 14A, the piezoelectric actuator A includes a piezoelectric device 31 comprised of an electrical-mechanical conversion element such as a piezo element, a rod 32 which is fixed to an electrical distortion (contracting/expanding) end of the piezoelectric device 31, a weight member 33 which is fixed to the other end of the piezoelectric device 31, and a movable member 4a (in this embodiment, the slider 4) which is movable along the rod 32 in frictional engagement with the rod 32. The rod 32 is reciprocated in forward and backward directions as shown in FIGS. 14A through 14C by contracting/expanding operation of the piezoelectric device 31. The weight member 33 is fixed to a weight mounting portion (the weight mounting portions 2233 in the example of FIG. 11), thereby restricting the piezoelectric device 31 from expanding in the backward direction.

FIGS. 14A through 14C are illustrations showing how the movable member 4a is moved forward and backward on the rod 32. FIG. 15 is a graph showing how the rod 32 is shifted with time. Specifically, a rectangular drive pulse voltage of a predetermined duty ratio is applied to the piezoelectric device 31, so that the movement of the rod 32 exhibits a serrated shape as shown in FIG. 15. It should be noted that the respective illustrations in FIGS. 14A, 14B, 14C correspond to the points of time (a), (b), (c) in the graph of FIG. 15.

Let it be assumed that the state as shown in FIG. 14A represents an initial state of the actuator. When the actuator is shifted from the initial state to the state as shown in FIG. 14B, specifically, when the piezoelectric device 31 gradually expands in the forward direction, the rod 32 is gradually moved forward with a moderate speed, as shown in FIG. 15. Thereby, the movable member 4a in frictional engagement with the rod 32 is moved forward by the frictional engaging force with the rod 32. On the other hand, when the actuator is shifted from the state as shown in FIG. 14B to the state as shown in FIG. 14C, namely, when the piezoelectric device 31 is contracted quickly, the rod 32 is retracted backward with a fast speed, with the result that there occurs a slippery movement in the movable member 4a in frictional engagement with the rod 32. Thereby, the movable member 4a is returned to a position slightly forward relative to the initial position, without following the retraction of the rod 32 in the backward direction.

As a result of repeating the aforementioned operation, the movable member 4a is moved forward along the rod 32 away from piezoelectric device 31. It should be appreciated that driving the actuator in a manner opposite to the movement pattern as shown in FIG. 15, so that gradual falling occurs following rapid rising, causes a phenomenon opposite to the above, and the movable member 4a is returned backward from the initial position. In the yaw actuator 3b, the movable member 4a corresponds to the slider 4, and the slider 4 is oscillated in the yaw direction by the yaw actuator 3b.

The elastic adhesives 36, 371, 372 are used for fixation of the actuator for the following reason. Since a piezoelectric device generally has a small deformation, it is preferable to drive the actuator provided with the piezoelectric device by utilizing a resonance phenomenon for efficient driving. In view of this, it is desirable to provide measures to secure the effect by the resonance phenomenon. It is, however, possible to use an adhesive of fixed type in the case where a certain deformation is obtainable.

The hall sensor 57 constituting part of the position detecting section 55 is loaded on the shake correction bedplate 22 to detect a two-dimensional position of the image sensor 20, as well as the yaw actuator 3b. The flexible wiring substrate 59 transmits an electric signal generated in the hall sensor 57 to the main controller, and transmits the signal to the pitch actuator 3a, which will be described later. The flexible wiring substrate 59 has a connecting portion 591 to which an end of a pitch flexible wiring substrate 391 (see FIG. 12) is connected.

<Image Sensor Holder> Next, the image sensor holder 26 is described referring to FIG. 12, and FIG. 7 concerning a side view thereof. The image sensor holder 26 not only supports the image sensor 20 and the low pass filter 21, but also supports an image sensor base plate 261, the pitch actuator 3a, a magnet 56 for position detection, and a heat releaser 265. The image sensor holder 26 is formed with a screw hole (not shown) for receiving a screw 2611 for mounting the image sensor base plate 261, an actuator mounting portion 263 for fixedly supporting the pitch actuator 3a, and a magnet mounting portion 264 formed with a recess for housing the magnet 56 therein. Further, the image sensor holder 26 has a rigid ball receiving portion 2621 formed in a protruding flat portion 262 formed at a corner portion of the image sensor holder 26 having a rectangular shape in plan view.

The image sensor base plate 261 is fixed to the image sensor holder 26 by the screw 2611 on the rear side of the image sensor 20. The heat releaser 265 having substantially the same size as the image sensor 20 of an aluminum flat plate is provided between the image sensor base plate 261 and the image sensor 20 (see FIG. 7). The heat releaser 265 has an extension on the side of the control circuit board 6, and the extension serves as a flexible guide portion 2651. The flexible guide portion 2651 has a curved portion oriented forward in the optical axis direction of the camera. The flexible guide portion 2651 is adapted to guide the flexible wiring substrate 201 into the hollow portion G defined between the side wall 1155 of the frame member 115 and the battery holder 651 in a state that the rear surface of the flexible wiring substrate 201 contacts the curved portion of the flexible guide portion 2651. This arrangement keeps the flexible wiring substrate 201 from being damaged by an external force, even if the flexible wiring substrate 201 is subjected to bending deformation or torsional deformation in response to oscillation of the shake correction unit 2.

The flat portion 262 protrudes from the corner portion of the image sensor holder 26 corresponding to the position where the first interlock spring mounting portion 224 (see FIG. 11) of the shake correction bedplate 22 is provided in a state that the image sensor holder 26 is placed over the shake correction bedplate 22. Rigid balls B1, B2 contact the upper and lower surfaces of the rigid ball receiving portion 2621, respectively, which will be described referring to FIG. 21.

Similarly to the yaw actuator 3b, the pitch actuator 3a mounted on the actuator mounting portion 263 comprises the piezoelectric device 31a, the rod 32a, and a weight member 33a having a rectangular shape in plan view. A drive voltage is applied to the piezoelectric device 31a via a lead wire 391L connected with the pitch flexible wiring substrate 391. The actuator mounting portion 263 includes a lead end mounting portion 2631 in the form of a bent piece formed with a through-hole for supporting a lead end portion 321a of the rod 32a, an intermediate mounting portion 2632 in the form of a bent piece formed with a through-hole for holding the vicinity of a base portion 322a of the rod 32a, and a weight mounting portion 2633 formed with a recess for fittingly mounting the weight member 33a therein. The actuator mounting portion 263 is further provided with an arch-like locking portion 2634 (see FIGS. 16A and 16B) above the weight mounting portion 2633, so that the weight member 33a is passed through a hollow portion defined below the arch-like locking portion 2634.

The lead end portion 321a of the rod 32a is fixed to the lead end mounting portion 2631 by the elastic adhesive 36. The weight member 33a at two forward portions thereof (on the side of the rod 32a) is fixed to a forward portion of the weight mounting portions 2633 by the elastic adhesive 371. The weight member 33a at two rearward portions thereof is fixed to a rearward portion of the arch-like locking portion 2634 by the elastic adhesive 372. The operation of the pitch actuator 3a fixedly supported on the actuator mounting portion 263 in the above manner is substantially the same as the operation of the yaw actuator 3b except that the image sensor holder 26 is oscillated in the pitch direction relative to the slider 4 in response to driving of the pitch actuator 3a.

The weight member 33a is fixed to the four positions of the weight mounting portion 2633, namely, two forward portions and two rearward portions thereof by the elastic adhesives 371, 372 for the following reason. Specifically, in response to a movement of the movable member (slider 4) relative to the image sensor base block 22 by driving of the pitch actuator 3a (or the yaw actuator 3b), a reactive force resulting from an inertia force is exerted to the fixing portions (adhesive portions) of the weight member 33a. The reactive force increases as the movable member is larger (heavier). Accordingly, adopting a relatively large frame-like movable member (slider 4) as in this embodiment results in generation of a large reactive force.

Figure 16A:
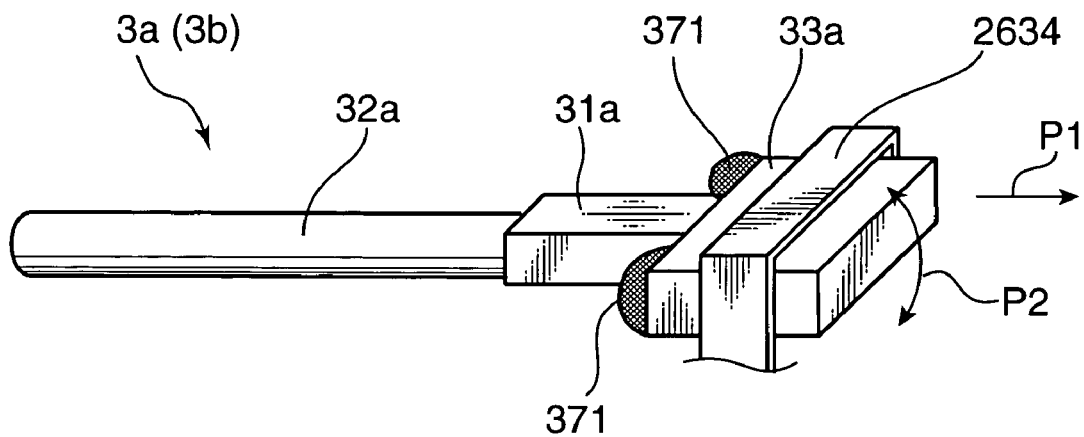
Figure 16B:
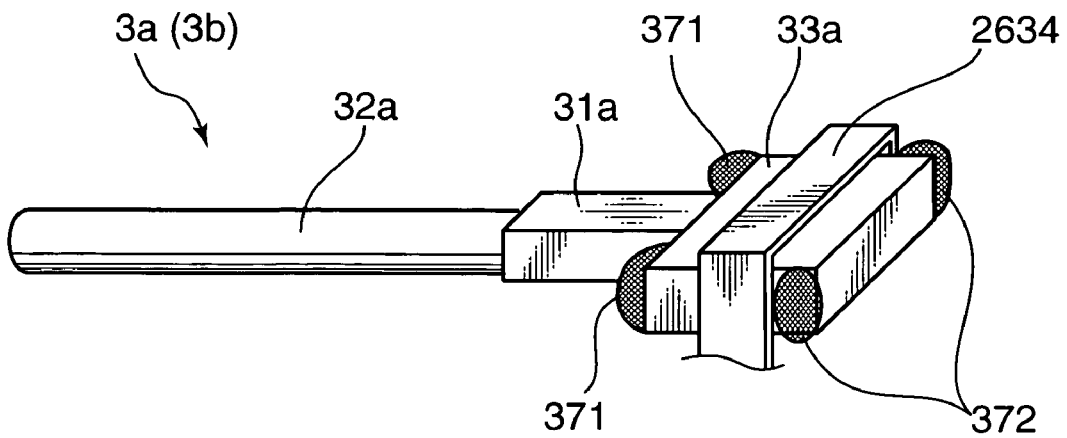

FIGS. 16A and 16B are perspective views each showing how the pitch actuator 3a (yaw actuator 3b) is fixed to the actuator mounting portion by an adhesive. As shown in FIG. 16A, in the case where the weight member 33a is fixed to the weight mounting portion 2633 merely at the forward portions thereof by the adhesive 371, it is highly likely that a generated large reactive force may excessively move the weight member 33a in the direction shown by the arrow P1 in FIG. 16A. Such an excessive movement of the weight member 33a may cause delay in servo control in the shake correction using the actuator, which may hinder stable servo control.

Further, in the case where an impact is applied to the camera body 10, a force is exerted to the weight member 33a to pivotally rotate the weight member 33a in the direction shown by the arrow P2 in FIG. 16A together with the integrally mounted piezoelectric device 31a by the adhesive 371. If such a rotary force is acted on the weight member 33a, the piezoelectric device 31a generally made of a ceramic material may be broken.

In view of the above, in this embodiment, as shown in FIG. 16B, the weight member 33a is fixed to the weight mounting portion 2633 not only at the forward portions by the adhesive 371 but also at the rearward portions by the adhesive 372. Providing the above fixing structure enables to securely restrain the weight member 33a from undesirably moving. Even if an undesirably large reactive force is generated, or a rotary force is generated by application of an impact, the weight member 33a is kept from undesirably moving. This arrangement provides the piezoelectric device 31a that is less likely to be damaged by application of an impact, as well as stable servo control.

Figure 17A:
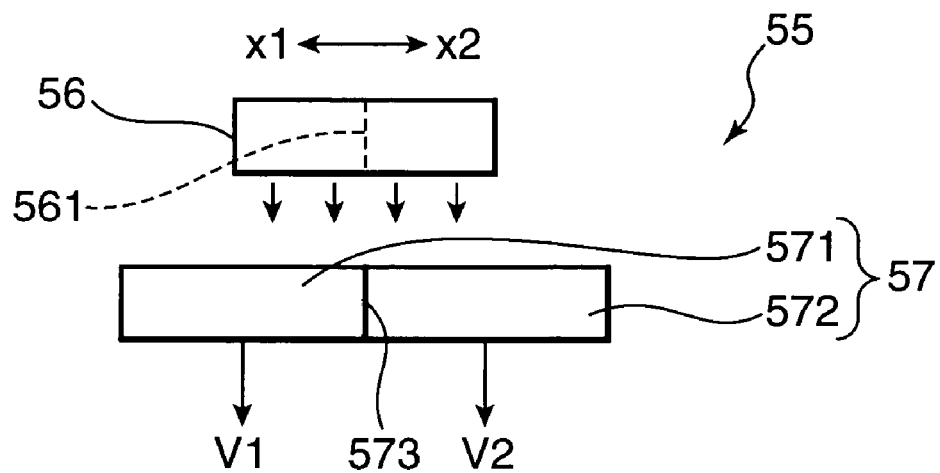
FIGS. 17A and 17B are illustrations for explaining an example of a position detecting section, wherein FIG. 17A schematically shows an arrangement of the position detecting section.

Referring to FIG. 12, the magnet 56 housed in the magnet mounting portion 264 constitutes part of the position detecting section 55 for detecting the position of the image sensor 20. The magnet 56 and the hall sensor 57 fixed on the shake correction bedplate 22 constitute a sensor pair of performing a position detecting operation. FIG. 17A is an illustration schematically showing an example of the position detecting section 55.

The hall sensor 57 includes a magnetic field detecting device that generates an electric signal depending on a magnetic field, and is constituted of a first sensing device 571 and a second sensing device 572 that are arranged side by side in the moving directions (in FIG. 17A, directions shown by the arrows x1 and x2) of the magnet 56. The magnet 56 is arranged opposing the first and second sensing devices 571, 572. The first sensing device 571 and the second sensing device 572 generate output voltages V1 and V2, respectively, depending on the magnetic field generated from the magnet 56.

Let it be assumed that the magnet 56 generates a uniform magnetic field. Then, in the case where a boundary 573 between the first sensing device 571 and the second sensing device 572 is aligned with an intermediate position of the magnet 56, the output voltages V1 and V2 are substantially identical to each other. As a result, a difference between the output voltages V1 and V2 is zero. On the other hand, in the case where the magnet 56 is shifted in the direction shown by the arrow x1, the first sensing device 571 is subjected to a larger influence of the magnetic field than the second sensing device 572. Thereby, the output voltage V1 of the first sensing device 571 is higher than the output voltage V2 of the second sensing device 572, with the result that a difference (V1−V2) becomes a positive value. On the other hand, in the case where the magnet 56 is shifted in the direction shown by the arrow x2, the second sensing device 572 is subjected to a larger influence of the magnetic field than the first sensing device 571. Therefore, the output voltage V2 of the second sensing device 572 is higher than the output voltage V1 of the first sensing device 571, with the result that a difference (V1−V2) becomes a negative value.

Figure 17B:
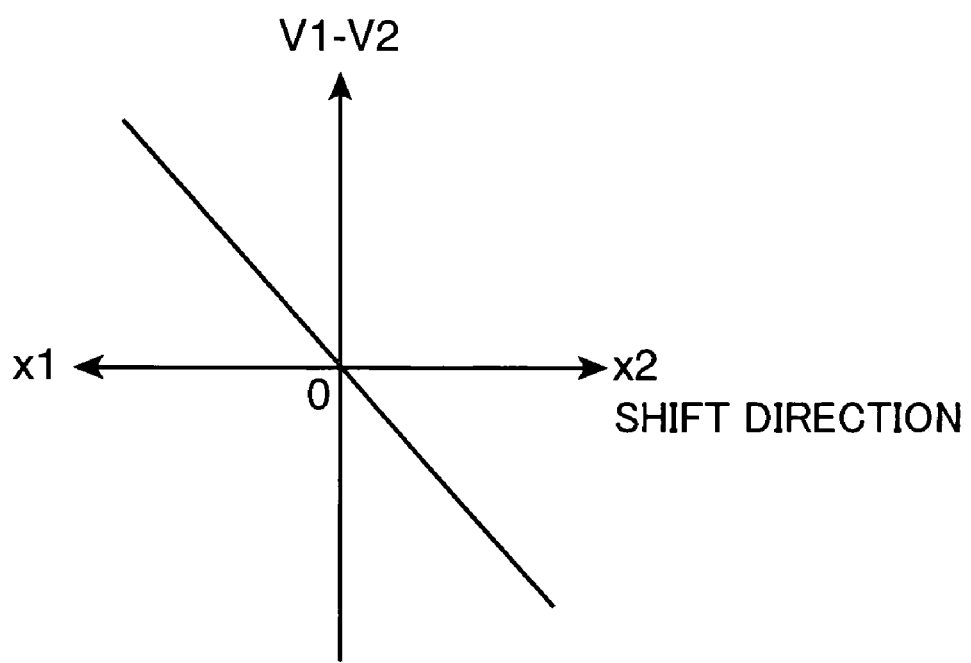

FIG. 17B is a graph summarizing the above. Specifically, a difference between the output voltages V1 and V2 shows linearity depending on the shifting of the magnetic 56 in the x1 or x2 direction. Accordingly, arranging sensing devices in four directions relative to the magnet 56 makes it possible to detect the position of the magnet 56 on a two-dimensional plane. Actually, the hall sensor 57 mounted on the shake correction bedplate 22 is a unitary sensor provided with four sensing devices.

In this embodiment, the hall sensor 57 is mounted on the shake correction bedplate 22 as a fixed base plate member, and the magnet 56 is mounted on the image sensor holder 26 as a movable base plate member. With this arrangement, even if the image sensor holder 26 (i.e., the image sensor 20) is oscillated in two directions by the pitch actuator 3a and the yaw actuator 3b, the current position of the image sensor 20 is securely predicted.

<Slider> Now, the slider 4 is described referring to FIG. 13. The slider 4 is a rectangular frame-like movable base plate member formed with the opening 400, and includes a four-sided main frame 41 made of a resin, the first frictional engaging portion 40a for the pitch actuator 3a, which is formed on a vertical side portion 41B of the main frame 41, the second frictional engaging portion 40b for the yaw actuator 3b, which is formed on a horizontal side portion 41H of the main frame 41, a first extension 43 formed on a first corner portion of the main frame 41 for mounting a second interlock spring mounting portion 431 and a rigid ball receiving plate 432, and a second extension 44 formed on a second corner portion of the main frame 41 diagonal to the first corner portion for providing shock absorbing function.

Figure 18:
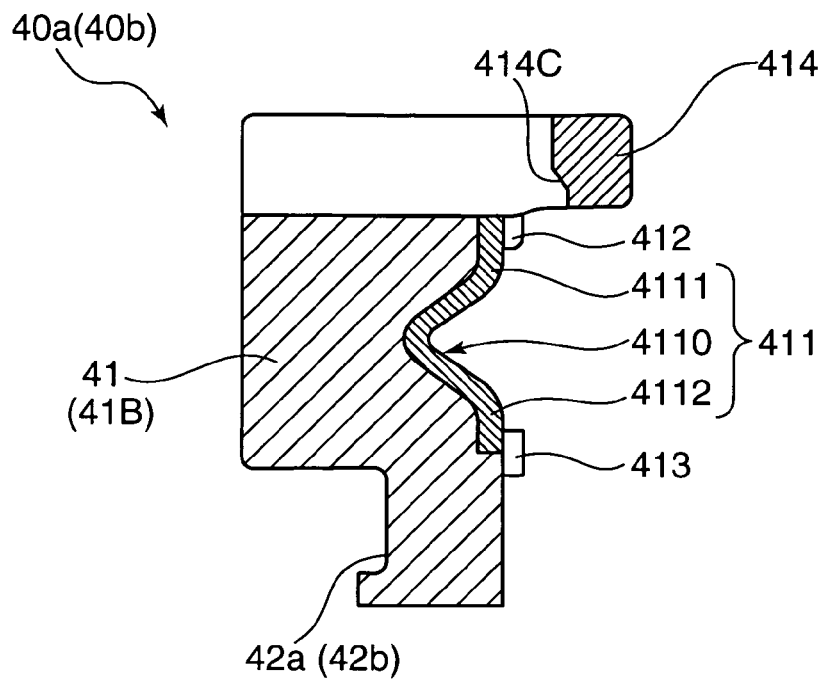
FIG. 18 is a cross-sectional view showing an arrangement of a frictional engaging portion of the slider.

FIG. 18 is a cross-sectional view showing an arrangement of the first frictional engaging portion 40a. The arrangement of the second frictional engaging portion 40b is substantially the same as the first frictional engaging portion 40a, and description thereof will be omitted. The first frictional engaging portion 40a is constructed such that a V-shaped groove in cross section is formed in the main frame 41 and a V-shaped metal member 411 having a V-shape in cross section is fittingly received in the V-shaped groove. More specifically, the V-shaped metal member 411 has a V-shaped bent portion 4110 at a widthwise intermediate portion thereof, and flange-like horizontal portions 4111, 4112 extending from opposite ends of the V-shaped bent portion 4110. Each one pair of pressing members 412, 413 are attached to the upper surfaces of the horizontal portions 4111, 4112 in a state that the pressing member pairs 412, 413 and the horizontal portions 4111, 4112 are partly placed one over the other, respectively. The pressing members 412, 413 are pressed against the horizontal portions 4111, 4112 to thereby fixedly attach the V-shaped metal member 411 to the main frame 411.

Figure 19:
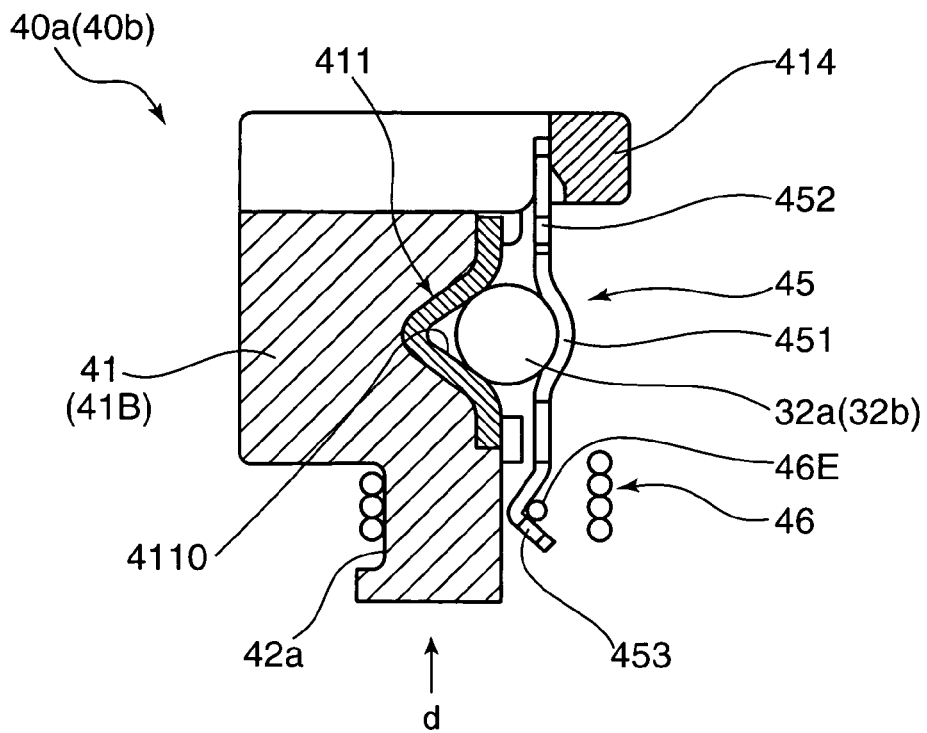
FIG. 19 is a cross-sectional view showing an engagement structure as to how the rod of the actuator and a pressing plate engage the frictional engaging portion of the slider.

As shown in FIG. 19, a pressing plate receiving portion 414 protrudes from an inner side portion (on the side of the opening 400) of the first frictional engaging portion 40a for receiving a pressing plate 45. A cavity 414C is formed in a lower portion of the pressing plate receiving portion 414 for receiving an engaging end portion 452 of the pressing plate 45. A spring holding portion 42a (42b) is formed in an outer side portion of the first frictional engaging portion 40a for holding a pressing force adjustment spring 46 which applies a holding force to the pressing plate 45.

The second interlock spring mounting portion 431 of the first extension 43 is formed with a through-hole for locking an interlock spring 228, which will be described later. The rigid ball receiving plate 432 is a metal flat plate, and is embedded in the resinous main frame 41. The second extension 44 is a projecting piece made of a resin.

As described above, the slider 4 is a composite structural unit made of the resinous main frame 41, the V-shape metal member 411, and the rigid ball receiving plate 432. The slider 4 is formed into the composite structural unit comprising the resin member and the metal member for the following reason. It is desirable that the frictional engaging portions 40a, 40b to be brought into frictional engagement with the rods 32a, 32b of the actuators 3a, 3b are generally made of a metal member having certain wear resistance to secure durability against friction. However, in the case where the first frictional engaging portion 40a and the second frictional engaging portion 40b are integrally formed with the main frame 41, as in the embodiment, unlike an arrangement that the first and second frictional engaging portions 40a, 40b are formed independently of the main frame 41, the weight of the slider 4 is increased if the entirety of the main frame 41 is made of a metal.

Such a heavy slider makes the responsive speed thereof slower in response to application of an oscillation force to the slider by the actuators 3a, 3b, with the result that the shake correction performance is degraded. In view of such a drawback, in this embodiment, the V-shaped metal member 411 is attached to each of the first and second frictional engaging portions 40a, 40b, which are essential elements in the embodiment, and the rigid ball receiving plate 432 is attached to the first extension 43 to make the slider 4 lighter and to keep a desirable responsiveness to driving for shake correction.

It is desirable to fabricate the slider 4 by setting, in a die, the V-shaped metal member 411 formed by bending a metal flat plate into a predetermined V-shape, and injecting a molten resin for forming the main frame 41 into the die for insert molding. For instance, in the case where the entirety of the slider 4 is made of a metal member, the slider is fabricated by die cast molding. It is likely that the surface of a molded product by the die cast molding is coarse, with the result that frictional engagement of the molded product with a frictional engaging portion is unstable. In view of this, it is required to stabilize the frictional engagement by conducting a secondary processing such as grinding or polishing operation, or a surface treatment. This embodiment employing the insert molding is advantageous in providing improved properties and production workability, because merely preparing a metal plate having a desired surface for frictional engagement, or a metal plate having durability against a rigid ball ensures these advantages.

It is desirable to use a high-strength resin usable in insert molding, as a resin material for forming the main frame 41 of the slider 4. Examples of such a resin are polyphenylene sulfide (PPS) resin and polycarbonate (PC) resin. It is desirable that the V-shaped metal member 411 is made of a metal having a high surface hardness, superior wear resistance, and a large specific gravity. Examples of the metal are SUS and phosphor bronze.

A preferred example of the slider 4 has been described above. As far as a high responsiveness to driving for shake correction is not required, it is possible to use a slider made of a metal member in its entirety. Alternatively, the entirety of the slider including a frictional engaging portion may be made of a resin having superior wear resistance.

Figure 20:
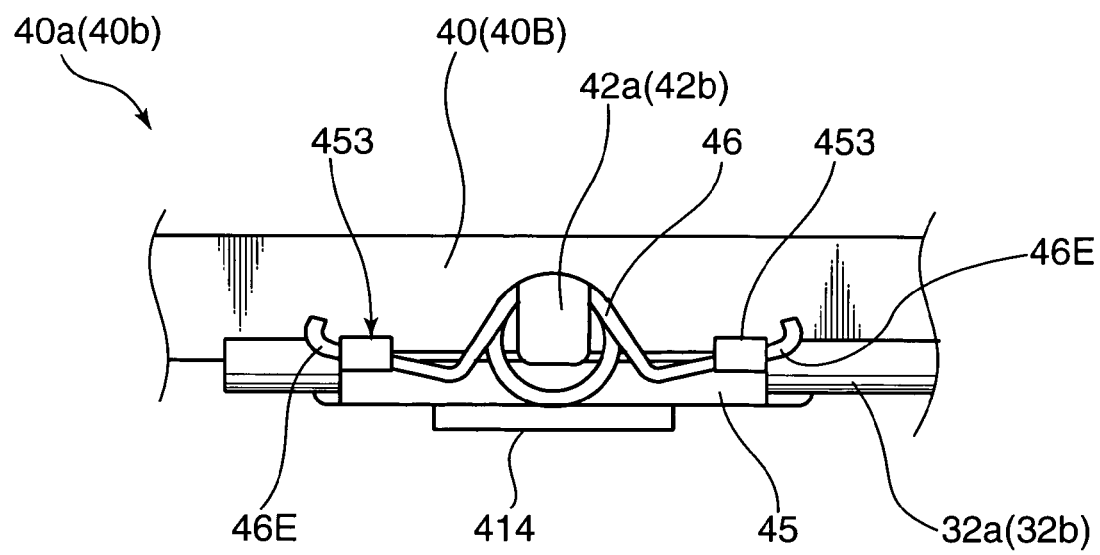
FIG. 20 is an illustration of the structure of FIG. 19 viewed from the direction shown by the arrow d in FIG. 19.

(Description on Assembling of Respective Components of Shake Correction Unit) In the following, described is an arrangement as to how the shake correction bedplate 22, the image sensor holder 26, the slider 4, the pitch actuator 3a, and the yaw actuator 3b are assembled together. The arrangement of the assembled unit is as shown in FIG. 10. In FIG. 10, the slider 4 shown in FIG. 13 is mounted on the shake correction bedplate 22 with its position reversed by 180°. FIG. 19 is a cross sectional view showing a structure as to how the first frictional engaging portion 40a (second frictional engaging portion 40b) of the slider 4 is frictionally engaged with the rod 32a (32b) of the pitch actuator 3a (yaw actuator 3b). FIG. 20 is an illustration of the engaging structure viewed from the direction shown by the arrow d in FIG. 19.

The rod 32a is engaged with the first frictional engaging portion 40a in a state that the V-shaped bent portion 4110 of the V-shaped metal member 411 of the first frictional engaging portion 40a is contacted with the outer surface of one longitudinal half side portion of the rod 32a. On the other hand, the pressing plate 45 is contacted with the outer surface of the other longitudinally half side portion of the rod 32a. The pressing plate 45 includes a curved portion 451 to be brought into contact with the rod 32a, the engaging end portion 452 to be fittingly received in the cavity 414C of the pressing plate receiving portion 414 of the slider 4, and locking portions 453 for locking the pressing force adjustment spring 46.

The pressing plate 45 is pressed against the rod 32a with a certain pressing force, whereby a predetermined frictional engaging force is generated between the rod 32a and the V-shaped metal member 411. Specifically, the engaging end portion 452 of the pressing plate 45 is fixedly pressed against the lower portion of the pressing plate receiving portion 414 by being fittingly received in the cavity 414C. The locking portions 453 are elastically pressed against the main frame 41 by the pressing force adjustment spring 46 having a predetermined spring force.

More specifically, the pressing force adjustment spring 46 is a coil spring with a main body thereof being held in the spring holding portion 42a (42b). As shown in FIG. 20, the opposite ends 46E of the pressing force adjustment spring 46 are locked by the locking portions 453 of the pressing plate 45. Use of the pressing force adjustment spring 46 is advantageous, because the pressing plate 45 is urged toward the slider 4 (V-shaped metal member 411) at the opposite ends 46E of the pressing force adjustment spring 46 having a certain spring force, with the spring holding portion 42a protruding from the slider 4 serving as a fulcrum. The rod 32a is pressed against the curved portion 451 of the pressing plate 45 by the spring force of the pressing force adjustment spring 46. With this arrangement, the rod 32a and the V-shaped metal member 411 are brought to frictional engagement.

Figure 21:
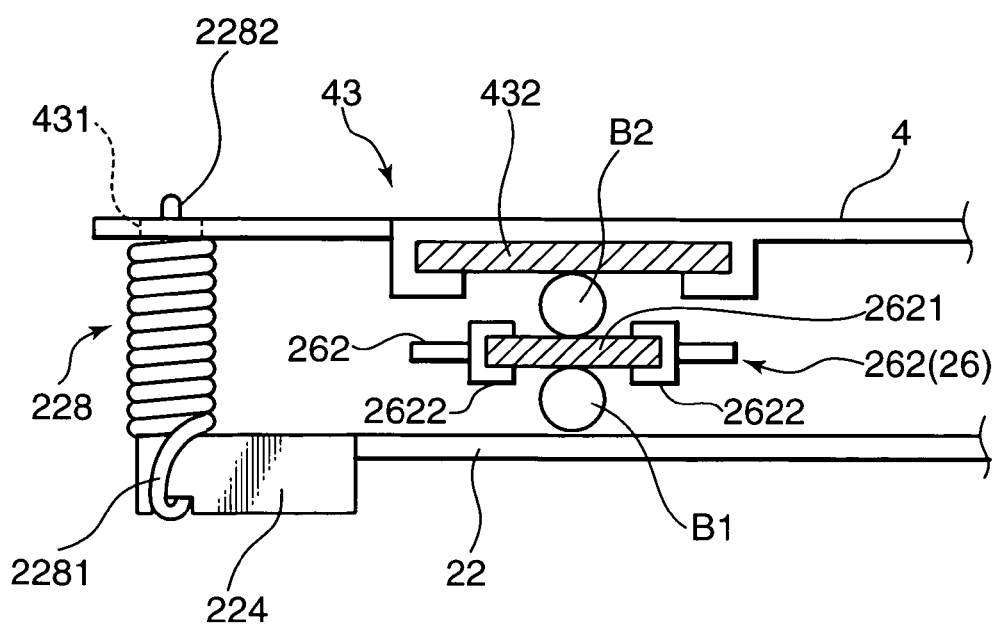
FIG. 21 is a cross-sectional view of an elastic interlock structure of elastically interlocking the shake correction bedplate with the slider, taken along the line e-e in FIG. 10.

FIG. 21 is a cross-sectional view taken along the line e-e in FIG. 10, showing an elastic interlock portion between the shake correction bedplate 22 and the slider 4. The shake correction bedplate 22 and the slider 4 are interlocked with each other by the frictional engagement of the rod 32b of the yaw actuator 3b with the V-shaped metal member 411 of the second frictional engaging portion 40b by way of the pressing plate 45. However, this interlock mechanism is not sufficient because the slider 4 may swing in the forward direction on the plane of FIG. 10. In view of such a drawback, the shake correction bedplate 22 and the slider 4 are interlocked with each other at a farthermost end portion away from the second frictional engaging portion 40b by the interlock spring 228. Furthermore, a slide mechanism employing rigid balls B1, B2 is adopted, so that the slider 4 is movable in the pitch direction even under the above interlock state.

Referring to FIG. 21, the first interlock spring mounting portion 224 of the shake correction bedplate 22, and the second interlock spring mounting portion 431 of the slider 4 are opposed to each other in the height (thickness) direction of the shake correction unit 2, and the interlock spring 228 is provided between the first interlock spring mounting portion 224 and the second interlock spring mounting portion 431. Specifically, the interlock spring 228 is a compression spring, with an end 2281 thereof being locked by the first interlock spring mounting portion 224 of the shake correction bedplate 22, and the other end 2282 thereof being locked by the second interlock spring mounting portion 431 of the slider 4. Thereby, the shake correction bedplate 22 and the slider 4 are interlocked with each other with a certain spring force.

The rigid balls B1, B2 are arranged in the vicinity of the interlock portion between the shake correction bedplate 22 and the slider 4 by the interlock spring 228. The rigid ball receiving portion 2621 is provided on the protruding flat portion 262 of the image sensor holder 26 with its upper and lower surfaces receiving the rigid balls B1, B2, respectively. The rigid ball receiving portion 2621 is a metal flat plate having durability against the rigid balls B1, B2, with a peripheral portion thereof being held by the resinous protruding flat portion 262. A holding portion 2622 for holding the peripheral portion of the rigid ball receiving portion 2621 has a large thickness. The holding portion 2622 functions as a stopper of the rigid balls B1, B2. As shown in FIG. 12, the rigid ball receiving portion 2621 is an elongated plate extending in the pitch direction, and has such a shape as not to obstruct oscillation of the image sensor holder 26 in the pitch direction relative to the slider 4.

The slider 4 has the rigid ball receiving plate 432 for receiving the rigid ball B2. The rigid ball receiving plate 432 is a metal flat plate with its peripheral portion encased and held by the resinous first extension 43. The rigid ball B1 is arranged between the shake correction bedplate 22 and the rigid ball receiving portion 2621 of the image sensor holder 26, and the rigid ball B2 is arranged between the rigid ball receiving portion 2621 and the slider 4, respectively. With this arrangement, the image sensor holder 26 slides in the pitch direction by rolling of the rigid balls B1, B2 while keeping an interval between the shake correction bedplate 22 and the slider 4 constant when a driving force of the pitch actuator 3a is applied to the image sensor holder 26.

Figure 22A:
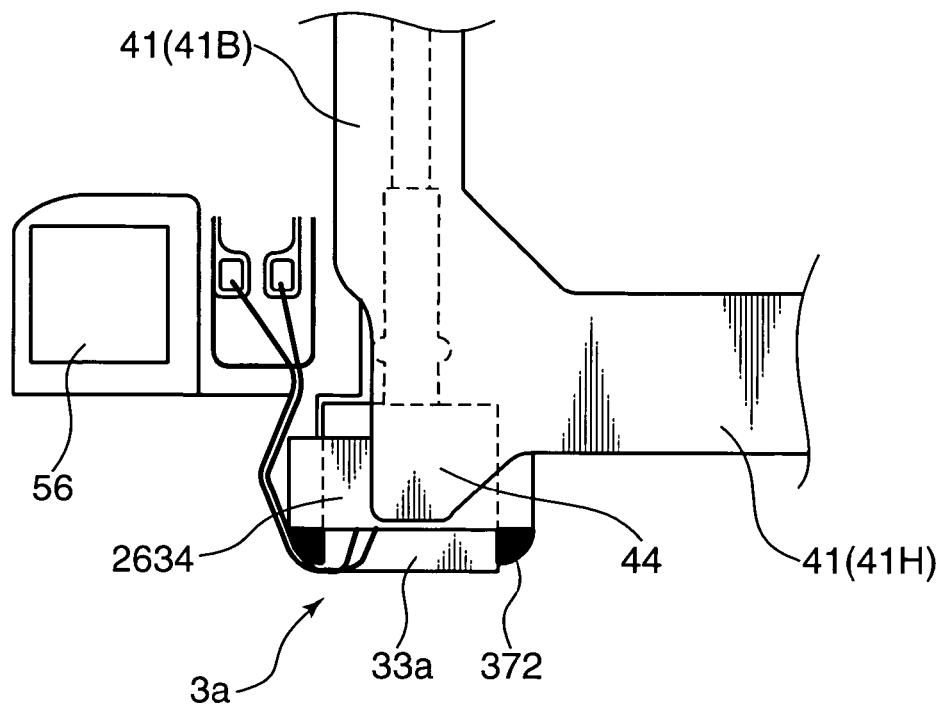
FIGS. 22A and 22B are illustrations enlargedly showing how end portions of the slider and the image sensor holder are partly overlapped with each other, specifically the portion viewed from the direction shown by the arrow f in FIG. 10.
Figure 22B:
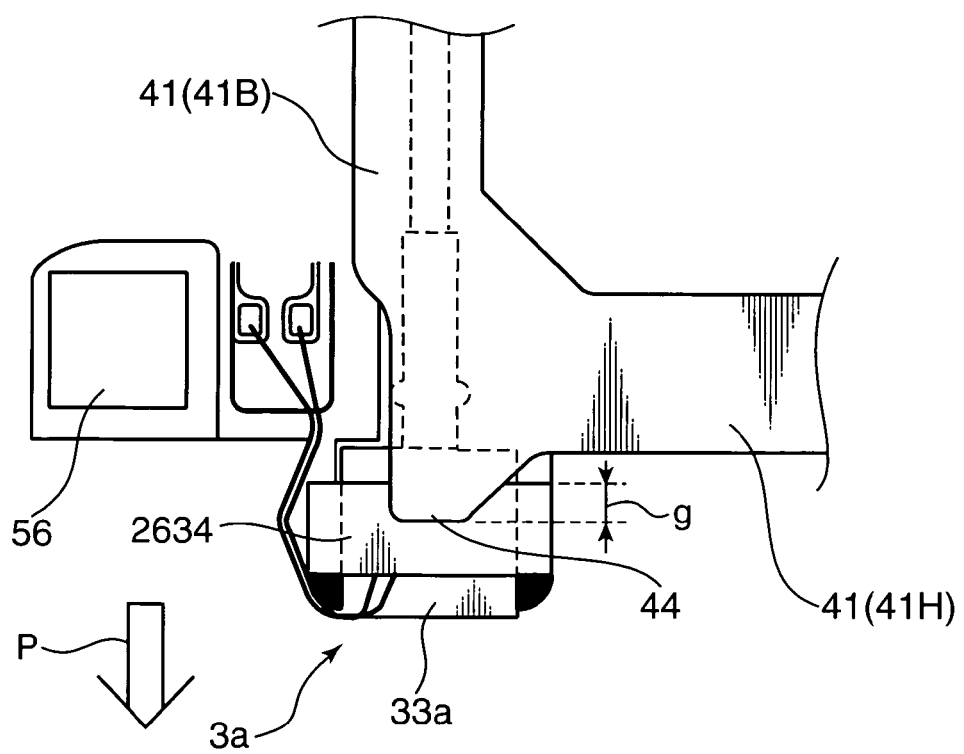

FIGS. 22A and 22B are illustrations enlargedly showing overlapped end portions of the slider 4 and the image sensor holder 26 (portion indicated by the arrow f in FIG. 10). In this embodiment, the slider 4 and the image sensor holder 26 have the overlapped portions at positions in proximity and opposed to each other while the slider 4 and the image sensor holder 26 are moved relative to each other. This arrangement contributes to improvement of durability against impact.

Specifically, as shown in FIG. 22A, the second corner portion of the slider 4 has the flat plate-like second extension 44. The arch-like locking portion 2634 is provided on the image sensor holder 26 in such a manner as to cover the weight member 33a of the pitch actuator 3a. The top surface of the arch-like locking portion 2634 is flat, and is opposed to a lower surface of the second extension 44 in proximity to each other by a small gap.

As shown in FIG. 22B, the image sensor holder 26 is oscillated relative to the slider 4 in the pitch direction shown by the arrow P in FIG. 22B. Even if the image sensor holder 26 is oscillated with a maximal oscillation width, the second extension 44 of the slider 4 and the arch-like locking portion 2634 of the image sensor holder 26 are placed one over the other by a certain width g. In other words, in whichever direction the image sensor holder 26 may be oscillated relative to the slider 4, the second extension 44 and the arch-like locking portion 2634 are overlapped in proximity to each other by a certain region.

In the above arrangement, even if an impact is exerted to the camera body 10 in a direction perpendicular on the plane of FIG. 22B, deformation of the image sensor holder 26 or operation to deform the image sensor holder 26 is obstructed by the interference with the second extension 44 and the arch-like locking portion 2634. Accordingly, the image sensor holder 26 is less likely to be damaged by application of an impact. Further, this arrangement effectively prevents breakage of the piezoelectric device 31a, in combination with the arrangement that the weight member 33a of the pitch actuator 3a is fixed at four points by the elastic adhesives 371, 372.

Figure 23:
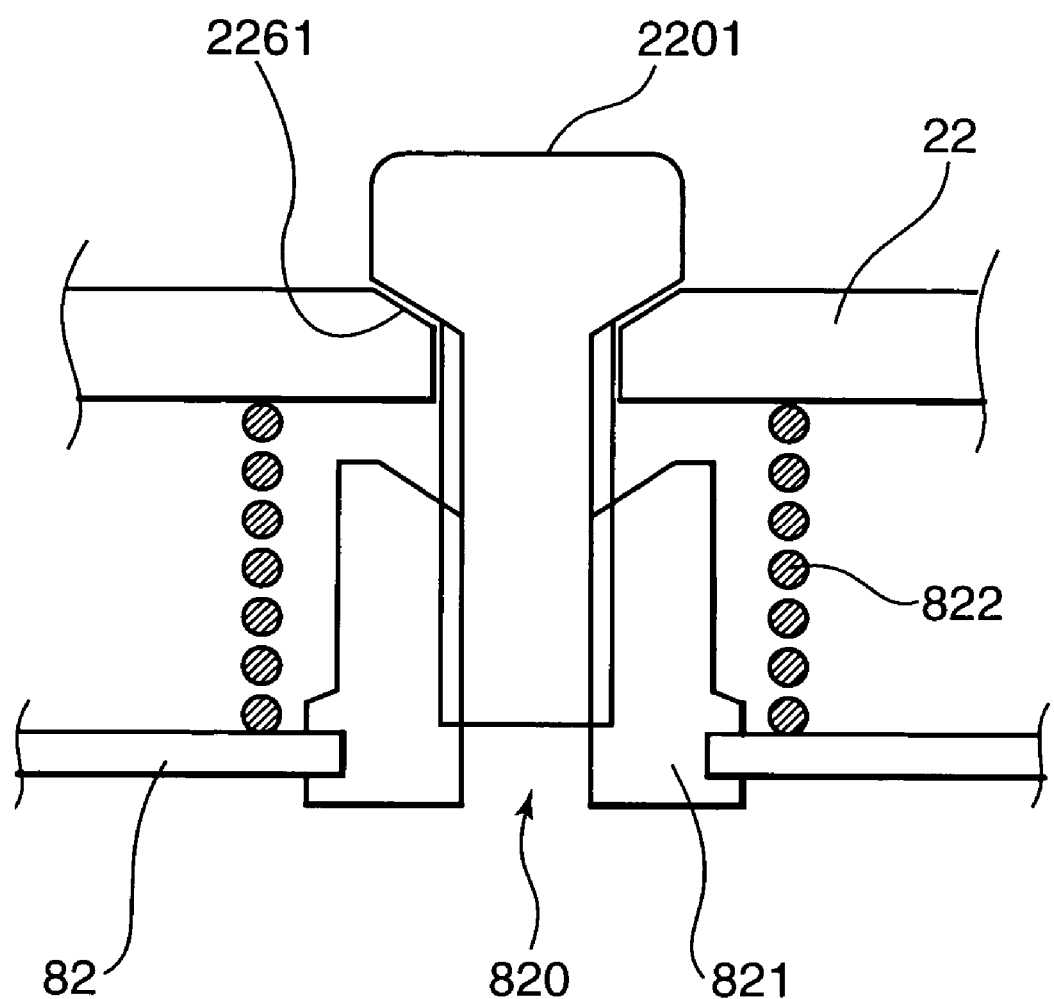
FIG. 23 is a cross-sectional view of an angular adjustment mechanism.

The shake correction unit 2 thus assembled is fixed to the camera body 10. Specifically, the shake correction bedplate 22 is mounted on the shutter pressing plate 82 which is fixed to the rigid frame member 115 (see FIGS. 6 and 7). The shutter correction base block 22 is fixed to the shutter pressing plate 82 with use of the adjustment screws 2201, 2202, 2203 which are adapted for regulating the angular position of the shake correction unit 2 relative to the optical axis, in place of simply fastening the shake correction unit 2. Specifically, screw holes 2261, 2262, 2263 are formed in predetermined positions on the shake correction bedplate 22, and the adjustment screws 2201, 2202, 2203 are screwed into the screw holes 2261, 2262, 2263, respectively to fixedly mount the shake correction bedplate 22 on the shutter pressing plate 82. As shown in FIG. 23, an angular adjustment mechanism is provided between the shake correction bedplate 22 and the shutter pressing plate 82.

The shutter pressing plate 82 is formed with a through-hole 820 for mounting a screw receptor 821. The adjustment screw 2201 is meshed with the screw receptor 821 in the screw hole 2261. A compression spring 822 is wound around the screw receptor 821. With this arrangement, the shake correction bedplate 22 and the shutter pressing plate 82 are urged away from each other by the urging force of the compression spring 822. The constructions regarding the adjustment screws 2202, 2203 are the same as that of the construction regarding the adjustment screw 2201.

With use of the angular adjustment mechanism, angular adjustment can be optimized, so that the imaging position of the object light image lies on the sensing plane of the image sensor 20, by optionally regulating the fastening of the adjustment screws 2201, 2202, 2203.

Figure 24:
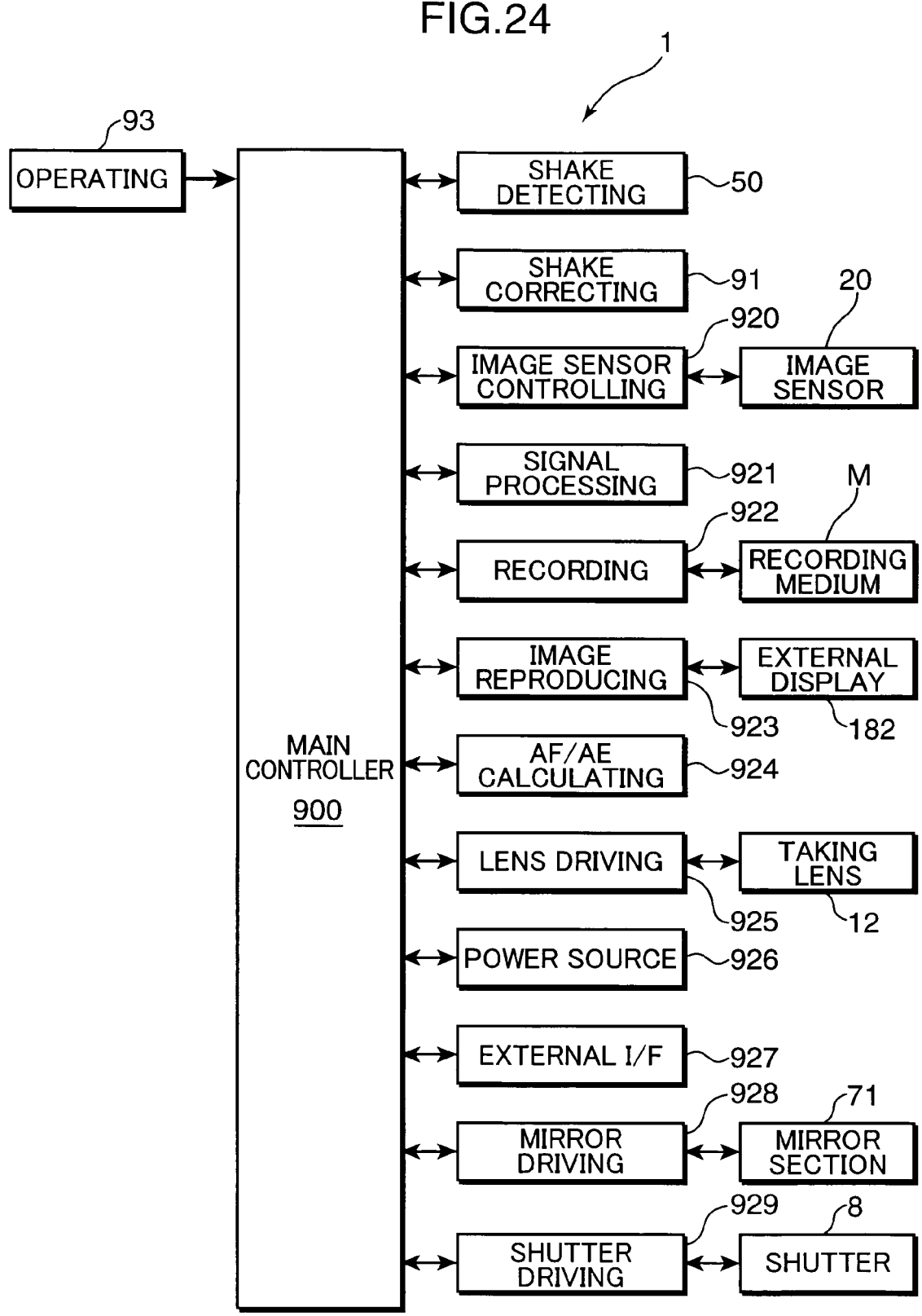
FIG. 24 is a block diagram showing an electrical configuration of the digital camera embodying the present invention.

(Description on Entire Electrical Configuration of Digital Camera) Now, an electrical configuration of the digital camera 1 in this embodiment is described. FIG. 24 is a block diagram showing the electrical configuration of the digital camera 1. As shown in FIG. 24, the digital camera 1 comprises the main controller 90, the shake detecting section 50, a shake correcting section 91, an image sensor controlling section 920, a signal processing section 921, a recording section 922, an image reproducing section 923, an AF/AE calculating section 924, a lens driving section 925, a power source section 926, an external interface (I/F) section 927, a mirror driving section 928, a shutter driving section 929, and an operating section 93 including the mode setting dial 16 and the release button 17.

The main controller 900 includes a read only memory (ROM) in which various control programs are stored, a random access memory (RAM) for temporarily storing data concerning calculation results and control processing, and a central processing unit (CPU) for reading the control program and the like from the ROM for execution. The main controller 900 controls operations of the respective parts of the digital camera 1 in response to receiving various signals from the shake detecting section 91, the operating section 93, the driving section and the like.

As mentioned above, the shake detecting section 50 is provided with the pitch gyro 50a and the yaw gyro 50b (see FIG. 5) for detecting shake of the camera body 10. The shake correcting section 91 is adapted to calculate moving amounts of the image sensor 20 to be moved by the pitch actuator 3a and the yaw actuator 3b, based on information concerning the shake of the camera body 10 detected by the shake detecting section 50, and information concerning the current position of the image sensor 20 detected by the position detecting section 55.

The image sensor controlling section 920 controls photoelectric conversion of the image sensor (CCD sensor) 20, and applies a predetermined analog processing such as gain control to the output signal outputted from the image sensor 20. Specifically, in response to a drive control signal outputted from a timing generator provided in the image sensor controlling section 920, the image sensor 20 is exposed to light from an object for a predetermined duration for converting the received light amount to an image signal, which is sent to the signal processing section 921 after gain control.

The signal processing section 921 applies predetermined analog signal processing and digital signal processing to the image signal outputted from the image sensor 20. The signal processing section 921 includes an analog signal processing circuit, and various digital signal processing circuits. The analog signal processing circuit includes a correlated double sampling (CDS) circuit for reducing noises in sampling of image signals, and an auto gain control (AGC) circuit for adjusting the level of the image signal, and applies a predetermined analog processing to an analog image signal outputted from the image sensor 20. The analog image signal outputted from the analog signal processing circuit is converted to a digital image signal by an analog-to-digital (A/D) conversion circuit for outputting the digital image signal to the digital signal processing circuit. The digital signal processing circuit includes an interpolation circuit for interpolating the A/D converted pixel data, a black level compensation circuit for compensating the black level of the respective A/D pixel data to a reference black level, a white balance (WB) circuit for adjusting white balance of the image data, and a gamma correction circuit for correcting gradations by correcting gamma characteristics of the respective pixel data. Further, the signal processing circuit 921 has an image memory for temporarily storing the image data after the signal processing.

The recording section 922 records the generated image data into a detachably attachable recording medium M such as a memory card, and reads out the image data stored in the recording medium M. The image reproducing section 923 processes the image data generated in the signal processing section 921, or the image data read out from the recording medium M by the recording section 922, and generates image data suitable for display on the external display section 182.

The AF/AE calculating section 924 performs computation for auto focusing (AF) control or auto exposure (AE) control. The lens driving section 925 controls driving of the lens group 122 of the taking lens 12. The taking lens 12 is provided with the focus lens, the zoom lens, the aperture for adjusting the transmissive light amount, and the lens ROM 123 in which information inherent to the lens such as f number and focal length is stored. The lens ROM 123 is connected with the main controller 900 via the electric contacts provided on the mount portion 13.

The power source section 926 includes a battery housed in the battery chamber 65 of the battery holder 651, and supplies power to the respective parts of the digital camera 1. The external I/F section 927 has the connector portion 68 provided with a housing for a remote terminal or a USB terminal, or with an input jack of an AC power source, and establishes an interface with an external device.

The mirror driving section 928 drives the mirror section 71 including the main mirror 711 and the sub mirror 712. The mirror driving section 928 drivingly retracts the main mirror 711 together with the sub mirror 712 from the optical axis L of the taking lens 12 by pivotally rotating the main mirror 711 based on a retraction signal outputted from the main controller 900. The retraction signal is generated in the main controller 900 in response to input of an on-signal indicative of turning on of the release button 17. Upon completion of a photographing operation, the mirror driving section 928 returns the mirror section 71 from the retracted state to an initial state where the main mirror 711 lies on the optical axis L by pivotally rotating the main mirror 711. The shutter driving section 929 drivingly opens and closes the shutter 8. The operating section 93 includes manipulation members such as the release button 17, the mode setting dial 16, the direction selecting key 192, and the shake correction switch 193, and are used to allow the user to enter desired designation.

Figure 25:
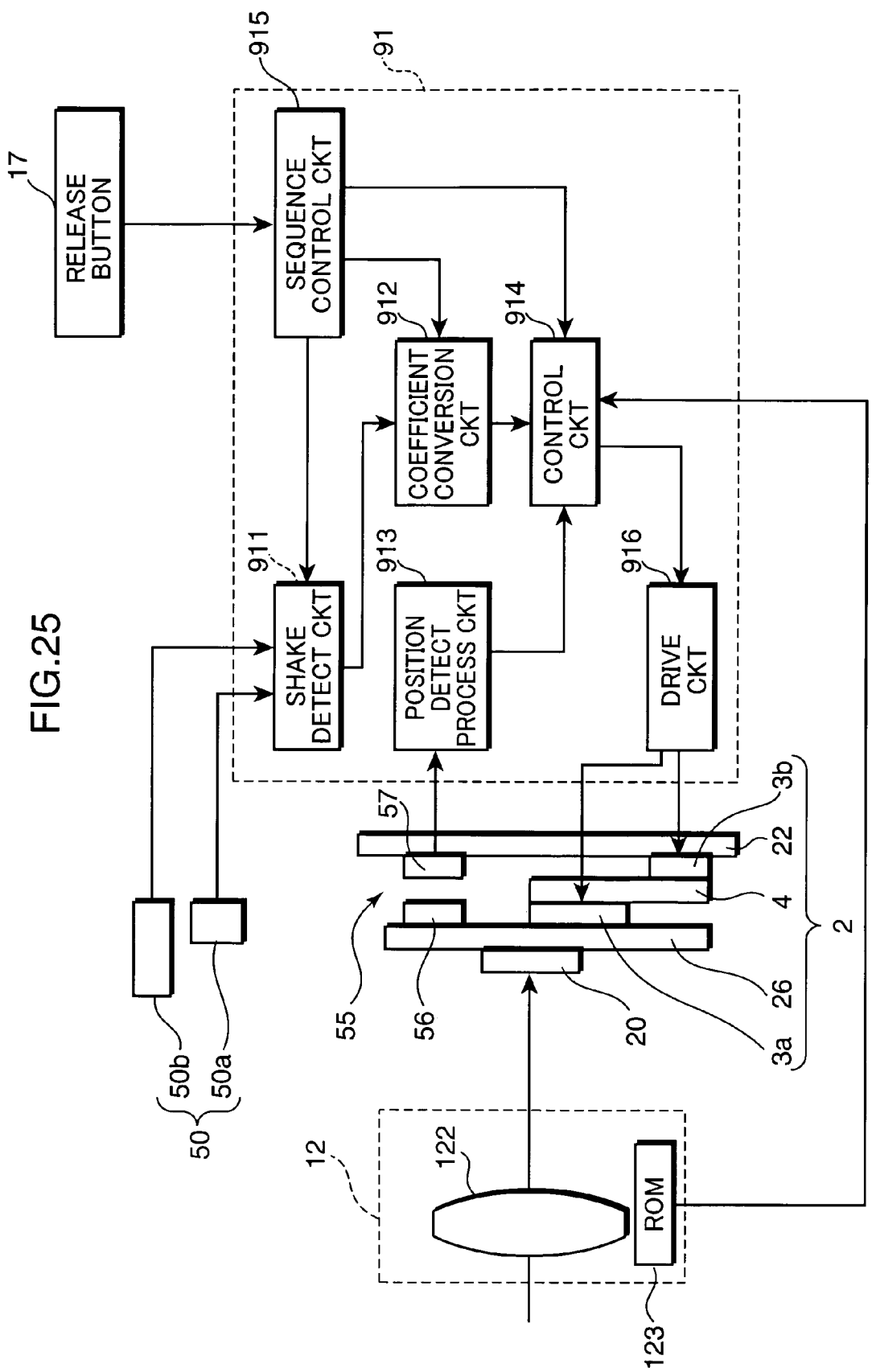
FIG. 25 is a block diagram schematically showing an electrical configuration of the shake correction mechanism including a functional block diagram of a shake correction section.

(Description on Electrical Configuration of Shake Correction Section) FIG. 25 is a block diagram schematically showing an electrical configuration of a shake correction mechanism, including a functional block diagram of the shake correction section 91. Elements other than the elements of the shake correction section 91 are denoted at the same reference numerals as the corresponding elements shown in FIGS. 1 through 24, and description thereof is omitted herein. The shake correction section 91 includes a shake detecting circuit 911, a coefficient conversion circuit 912, a position detection processing circuit 913, a controlling circuit 914, a sequence controlling circuit 915, and a driving circuit 916.

An angular velocity signal indicative of oscillation of the camera body 10 in the pitch direction detected by the pitch gyro 50a, and an angular velocity signal indicative of oscillation of the camera body 10 in the yaw direction detected by the yaw gyro 50b are outputted to the shake detecting circuit 911. The shake detecting circuit 911 includes a filter circuit (low pass filter and high pass filter) for reducing noises and drifts from the detected angular velocity signals, an amplification circuit for amplifying the respective angular velocity signals, and an integration circuit for converting the respective angular velocity signals to angular signals. Specifically, the shake detecting circuit 911 reads the respective angular velocity signals at a predetermined time interval, and outputs the readout angular velocity signals as detx, dety to the coefficient conversion circuit 912, where detx represents a shake amount of the camera body 10 in the yaw direction, and dety represents a shake amount of the camera body 10 in the pitch direction.

The coefficient conversion circuit 912 converts the respective shake amounts (detx, dety) outputted from the shake detecting circuit 911 to moving amounts (px, py) by which the image sensor 20 is to be moved in the yaw direction and the pitch direction by the yaw actuator 3b and the pitch actuator 3a.

The position detection processing circuit 913 detects output voltages of the respective hall sensing devices incorporated two-dimensionally in the hall sensor 57, and performs calculation to determine the current position of the image sensor 20 based on the principle described referring to FIGS. 17A and 17B. The position signals calculated by the position detection processing circuit 913, and the signals indicative of the respective moving amounts (px, py) calculated by the coefficient conversion circuit 912 are outputted to the controlling circuit 914.

The controlling circuit 914 converts the signals indicative of the respective moving amounts (px, py) to actual drive signals (drvx, drvy), considering the position information of the image sensor 20, the operating characteristics of the pitch actuator 3a and the yaw actuator 3b, and other factor. The controlling circuit 914 reads out the information relating to the focal length or the like stored in the lens ROM 123 of the taking lens 12, and generates the drive signals (drvx, drvy) depending on the focal length of the taking lens 12 actually mounted on the mount portion 13. The respective drive signals (drvx, drvy) generated in the controlling circuit 914, as corrective moving amount signals indicative of moving amounts by which the image sensor 20 is to be correctively moved in the pitch and yaw directions, are outputted to the driving circuit 916 for generating drive pulses for actually driving the pitch actuator 3a and the yaw actuator 3b.

The operations of the shake detecting circuit 911, the coefficient conversion circuit 912, and the controlling circuit 914 are controlled by the sequence controlling circuit 915. Specifically, the sequence controlling circuit 915 causes the shake detecting circuit 911 to read the data signals concerning the respective shake amounts (detx, dety) in response to depressing of the release button 17. Subsequently, the sequence controlling circuit 915 controls the coefficient conversion circuit 912 to convert the respective shake amounts to the moving amounts (px, py), and causes the controlling circuit 914 to calculate the corrective moving amounts of the image sensor 20 based on the respective moving amounts (px, py). The above operations are cyclically repeated at a predetermined time interval from the start of depressing the release button 17 until exposure is terminated.

Figure 26:
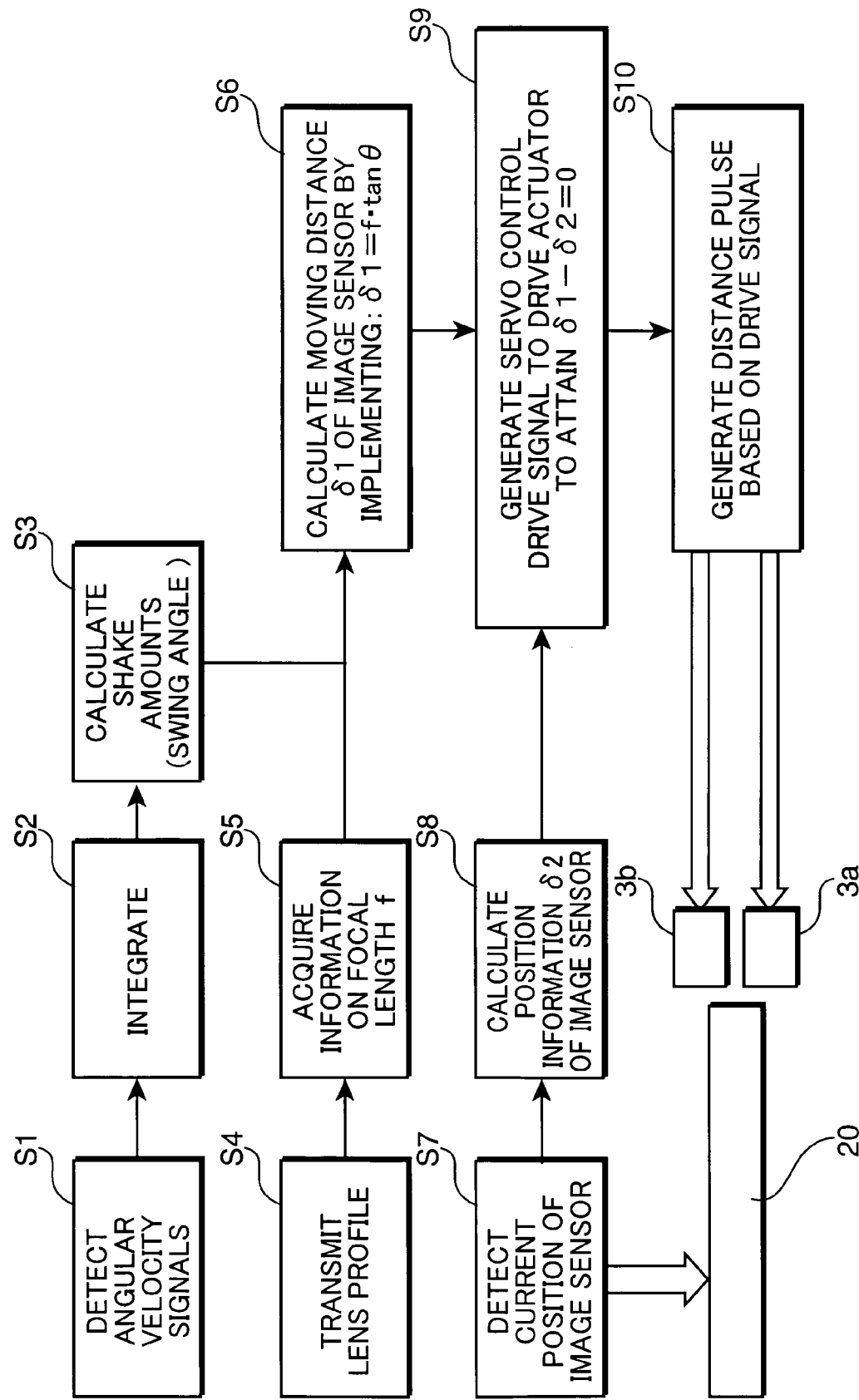
FIG. 26 is a block diagram showing a process flow as to how the shake correction section is operated.

FIG. 26 is a process flow showing a shake correction of the shake correction section 91. When the shake correction process is initiated, angular velocities of shake of the camera body 10 in the pitch direction and the yaw direction are detected by the pitch gyro 50a and the yaw gyro 50b (Step S1). The detected angular velocity signals are outputted to the shake detecting circuit 911 where the angular velocity signals are converted to angular signals by integration (Step S2). Then, the shake amounts (detx, dety) of the camera body 10 in the pitch direction and the yaw direction, namely, a swing angle □ is obtained (Step S3). The information relating to the swing angle □ is outputted to the controlling circuit 914.

The lens profile including the information relating to the focal length f stored in the lens ROM 123 of the taking lens 12 is outputted (Step S4), and the controlling circuit 914 acquires the information relating to the focal length f (Step S5). The information relating to the focal length f may be acquired when the taking lens 12 is mounted on the mount portion 13, in place of being acquired at the time of shake correction.

Then, the controlling circuit 914 obtains a distance δ1 by which the image sensor 20 is to be correctively moved to cancel the shake of the camera body 10, based on the swing angle θ and the focal length f by implementing the following equation (Step S6):

$$\delta 1 = f \tan \theta$$

The distance δ1 corresponds to the moving amounts (px, py) in the yaw and pitch directions.

The hall sensor 57 (position detecting section 55) executes an operation to detect the current position the image sensor 20 (Step S7). The detected position signal is outputted to the position detection processing circuit 913, wherein position information δ2 indicative of the current position of the image sensor 20 is calculated (Step S8). The position information δ2 is outputted to the controlling circuit 914.

The controlling circuit 914 performs servo control in response to receiving the position information δ2 (Step S9). Specifically, the drive signals (drvx, drvy) for operating the yaw actuator 3b and the pitch actuator 3a are generated to make a difference between the moving distance δ1 of the image sensor 20 and the position information δ2 zero: (δ1−δ2=0) (Step S9). The drive signals (drvx, drvy) are outputted to the driving circuit 916, which in turn generates drive pulses for actually driving the yaw actuator 3b and the pitch actuator 3a.

A preferred embodiment of the present invention has been described above. The present invention is not limited to the above, and can take the following modifications.

(1) In the embodiment, a so-called smooth impact type piezoelectric actuator comprising a piezoelectric device and a rod is used as an actuator (driving unit). Alternatively, as far as the image sensor 20 is movable at least in two directions perpendicular to the optical axis of the camera in quick response to shake of the camera body 10, any arrangement of the actuator is applicable. For instance, it is possible to provide an actuator using a moving coil arranged such that oscillation force is applied in two axial directions, an actuator incorporated with a small electric motor and a gear mechanism, or a ball screw mechanism, an actuator using a pressure mechanism, or a like actuator on the side of a side portion of the image sensor 20.

(2) In the case where the actuator for moving the image sensor 20 in two axial directions perpendicular to the optical axis is arranged on the side of a side portion of the image sensor 20, as shown in FIG. 1, it is possible to arrange the actuator (driving unit) on the side of the side portion 20b of the image sensor 20 transversely opposing the side portion 20a in proximity to the control circuit board 6, or on the side of the side portion 20d vertically opposing the side portion 20c in proximity to the viewfinder section 7.

(3) In the embodiment, the viewfinder section 7 is an optical viewfinder for use in a single-lens reflex camera provided with a mirror section. The viewfinder section 7 may be an electronic viewfinder or the like. In such a modification, the distance between the electronic viewfinder and the image sensor 20 can be shortened by arranging the actuator on the side of the side portion 20d vertically opposing the side portion 20c in proximity to the electronic viewfinder, which facilitates designing of a compact camera.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A camera with a shake correction mechanism comprising:
   an image sensor to capture a light image of an object to be photographed;
   a shake detector to detect a shake of a main body of the camera;
   a shake correction unit including a driving section to apply an oscillating force to the image sensor at a side portion thereof to oscillate the image sensor in a direction perpendicular to an optical axis of the camera; and
   a control circuit board having electronic components thereon;
   a connecting member configured to electrically connect the control circuit board and the image sensor, at a portion where the shake correction unit and the control circuit board are arranged in proximity to each other, wherein
   the shake correction unit and the control circuit board are arranged in proximity to each other on planes substantially identical to each other, and operatively coupled to each other by wiring at adjacent side portions, and wherein
   the driving section is arranged on a side of a side portion of the image sensor that is opposite from the adjacent side portions so as to minimize a length of the wiring between the image sensor and the control circuit board.

2. A camera with a shake correction mechanism according to claim 1, wherein the control circuit board includes a semiconductor integrated circuit device for image processing.

3. A camera with a shake correction mechanism according to claim 1, wherein the driving section includes a piezoelectric actuator.

4. A camera with a shake correction mechanism comprising:
   an image sensor in a rectangular shape defining four side portions to capture a light image of an object to be photographed;
   a shake detector to detect a shake of a main body of the camera;
   a shake correction unit including a driving section to apply an oscillating force to the image sensor at one of the four side portions to oscillate the image sensor in a direction perpendicular to an optical axis of the camera; and
   a control circuit board having electronic components thereon;
   a connecting member configured to electrically connect the control circuit board and the image sensor, at a portion where the shake correction unit and the control circuit board are arranged in proximity to each other, wherein the shake correction unit and the control circuit board are arranged in proximity to each other on planes substantially identical to each other, and operatively coupled to each other by wiring at adjacent side portions, and wherein the driving section is arranged on a side of one of the four side portions of the image sensor, which is away from the adjacent side portions, so as to minimize a length of wiring between the image sensor and the control circuit board.

5. A camera with a shake correction mechanism according to claim 4, wherein the control circuit board includes a semiconductor integrated circuit device for image processing.

6. A camera with a shake correction mechanism according to claim 4, wherein the driving section includes a piezoelectric actuator.

7. A camera with a shake correction mechanism according to claim 4, further comprising a connecting member to electrically connect the control circuit board and the image sensor.

8. A camera with a shake correction mechanism comprising:

an image sensor in a rectangular shape defining four side portions to capture a light image of an object to be photographed;

a shake detector to detect a shake of a main body of the camera;

a shake correction unit including a first driving section to apply an oscillating force to the image sensor at one of the four side portions to oscillate the image sensor in a first direction perpendicular to an optical axis of the camera, and a second driving section to apply an oscillating force to the image sensor at another one of the four side portions to oscillate the image sensor in a second direction perpendicular to the optical axis and the first direction;

a control circuit board having electronic components thereon a connecting member configured to electrically connect the control circuit board and the image sensor, at a portion where the shake correction unit and the control circuit board are arranged in proximity to each other; and a viewfinder section to allow a user to confirm a field to be photographed, wherein the shake correction unit, the control circuit board, and the viewfinder section are arranged in proximity to each other on planes substantially identical to each other, the shake correction unit and the control circuit board are operatively coupled to each other by wiring at adjacent side portions;

the first driving section is arranged on a side portion of the image sensor that is opposite from the adjacent side portions, and the second driving section is arranged on a side portion of the image sensor that is away from the adjacent side portions, wherein the position of the first and second driving sections is configured to minimize a length of wiring between the image sensor and the control circuit board.

9. A camera with a shake correction mechanism according to claim 8, wherein the control circuit board includes a semiconductor integrated circuit device for image processing.

10. A camera with a shake correction mechanism according to claim 8, wherein the viewfinder section includes an optical viewfinder.

11. A camera with a shake correction mechanism according to claim 8, wherein the driving section includes a piezoelectric actuator.

12. A camera with a shake correction mechanism according to claim 8, further comprising a connecting member to electrically connect the control circuit board and the image sensor.

13. A camera with a shake correction mechanism comprising:

an image sensor in a rectangular shape defining four side portions to capture a light image of an object to be photographed;

a shake detector to detect a shake of a main body of the camera;

a shake correction unit including a driving section to apply an oscillating force to the image sensor at one of the four side portions to oscillate the image sensor in a direction perpendicular to an optical axis of the camera; and a control circuit board having electronic components thereon;

a connecting member configured to electrically connect the control circuit board and the image sensor, at a portion where the shake correction unit and the control circuit board are arranged in proximity to each other;

the shake correction unit and the control circuit board arranged next to each other without being superimposed on each other in an optical axis direction, and the driving section is arranged on a side portion of one of the four side portions opposite to another one of the four side portions in proximity to an adjoining portion of the shake correction unit and the control circuit board.

14. The camera with a shake correction mechanism according to claim 13, wherein the driving section includes a piezoelectric actuator.

15. A camera with a shake correction mechanism comprising:

an image sensor in a rectangular shape defining four side portions to capture a light image of an object to be photographed;

a shake detector to detect a shake of a main body of the camera;

a shake correction unit including a first driving section configured to apply an oscillating force to the image sensor at one of the four side portions to oscillate the image sensor in a first direction perpendicular to an optical axis of the camera, and a second driving section configured to apply an oscillating force to the image sensor at another one of the four side portions to oscillate the image sensor in a second direction perpendicular to the optical axis and the first direction;

a control circuit board having electronic components thereon;

a connecting member configured to electrically connect the control circuit board and the image sensor, at a portion where the shake correction unit and the control circuit board are arranged in proximity to each other; and a viewfinder section to allow a user to confirm a field to be photographed, wherein the shake correction unit, the control circuit board, and the viewfinder section are arranged next to each other without being superimposed on one another in an optical axis direction;

the first driving section is arranged on a side of second one of the four side portions opposite to a first one of the four side portions in proximity to an adjoining portion of the shake correction unit and the control circuit board; and the second driving section is arranged on a side of a fourth one of the four side portions opposite to a third one of the four side portions in proximity to an adjoining portion of the shake correction unit and the viewfinder section.

16. The camera with a shake correction mechanism according to claim 15, wherein the driving section includes a piezoelectric actuator.

* * * * *

UNITED STATES PATENT AND TRADEMARK OFFICE
CERTIFICATE OF CORRECTION

| | |
|---|---|
| PATENT NO. | : 7,471,886 B2 |
| APPLICATION NO. | : 11/210503 |
| DATED | : December 30, 2008 |
| INVENTOR(S) | : Toshihiko Hirota et al. |

Page 1 of 1

It is certified that error appears in the above-identified patent and that said Letters Patent is hereby corrected as shown below:

On the Title Page

Front sheet, item (75), after "Hirota," delete "Sakai" and substitute --Osaka-- in its place; and after "Tanaka," delete "Kawachinagano" and substitute --Osaka-- in its place.

In the Claims

In column 31, claim 15, line 1, after "is arranged on a side of" insert --a--.

Signed and Sealed this

Twenty-ninth Day of September, 2009

David J. Kappos
*Director of the United States Patent and Trademark Office*